US007433829B2

(12) United States Patent
Borgia et al.

(10) Patent No.: US 7,433,829 B2
(45) Date of Patent: Oct. 7, 2008

(54) SYSTEM AND METHOD FOR MANAGING GLOBAL RISK

(75) Inventors: Evelyn Borgia, New Hyde Park, NY (US); Jodi Miller, New Hyde Park, NY (US); Graham De Gottal, New York, NY (US); Christine O'Connor, New Hyde Park, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 52 days.

(21) Appl. No.: 10/012,934

(22) Filed: Dec. 10, 2001

(65) Prior Publication Data
US 2002/0129221 A1    Sep. 12, 2002

Related U.S. Application Data

(60) Provisional application No. 60/254,847, filed on Dec. 12, 2000.

(51) Int. Cl.
*G06F 9/44*    (2006.01)
(52) U.S. Cl. ............................................. 705/7
(58) Field of Classification Search ................... 705/10, 705/1, 7
See application file for complete search history.

(56) References Cited

U.S. PATENT DOCUMENTS

| | | |
|---|---|---|
| 3,634,669 A | 1/1972 | Soumas et al. |
| 3,946,206 A | 3/1976 | Darjany |
| 4,047,033 A | 9/1977 | Malmberg et al. |
| 4,465,206 A | 8/1984 | Sorel et al. |
| 4,545,838 A | 10/1985 | Minkus et al. |
| 4,582,985 A | 4/1986 | Lofberg |
| 4,614,861 A | 9/1986 | Pavlov et al. |

(Continued)

FOREIGN PATENT DOCUMENTS

CA    2293321    12/1998

(Continued)

OTHER PUBLICATIONS

Kase, Risk Management Opportunities for the Community Bank, ABA Bank Compliance, vol. 19, Issue 9, Sep./Oct. 1998, start p. 29 [PROQUEST].*

(Continued)

*Primary Examiner*—Susanna M Diaz
(74) *Attorney, Agent, or Firm*—Hunton & Williams LLP

(57) ABSTRACT

A system for tracking compliance to risk management policies for a given enterprise that provides risk status feedback on hierarchical managerial levels. The system notifies users of potential problems with non-compliance of enterprise policies set on a high level of enterprise management, and prompts the users to take steps to achieve compliance. The enterprise policies are designed to protect the enterprise from various forms of risk associated with enterprise activities. Accordingly, minimizing risk across enterprise operations, subdivisions, projects and applications produces an overall benefit of reduced liability or exposure to liability for the entire enterprise. A compliance status is provided by business groups at all levels of the enterprise, and consolidated for each management level to which the risk status is promoted. Higher level managers can view summaries of risk management status for the business divisions, and select particular statuses to view compliance among various business groups under the manager's responsibility.

15 Claims, 13 Drawing Sheets

U.S. PATENT DOCUMENTS

| | | | |
|---|---|---|---|
| 4,634,845 A | 1/1987 | Riley | |
| 4,689,478 A | 8/1987 | Hale et al. | |
| 4,700,055 A | 10/1987 | Kashkashian, Jr. | |
| 4,746,787 A | 5/1988 | Okada | |
| 4,750,119 A | 6/1988 | Robertson | |
| 4,752,676 A | 6/1988 | Leonard et al. | |
| 4,754,418 A | 6/1988 | Hara | |
| 4,766,293 A | 8/1988 | Boston | |
| 4,766,539 A | 8/1988 | Fox | |
| 4,789,928 A | 12/1988 | Fujisaki | |
| 4,822,985 A | 4/1989 | Boggan et al. | |
| 4,831,242 A | 5/1989 | Englehardt | |
| 4,831,526 A | 5/1989 | Luchs | |
| 4,837,422 A | 6/1989 | Dethloff et al. | |
| 4,868,376 A | 9/1989 | Lessin et al. | |
| 4,870,259 A | 9/1989 | Boggan et al. | |
| 4,882,675 A | 11/1989 | Nichtberger et al. | |
| 4,897,533 A | 1/1990 | Lyszczarz | |
| 4,906,826 A | 3/1990 | Spencer | |
| 4,908,521 A | 3/1990 | Boggan et al. | |
| 4,923,288 A | 5/1990 | Allen et al. | |
| 4,928,001 A | 5/1990 | Masada | |
| 4,941,090 A | 7/1990 | McCarthy | |
| 4,943,707 A | 7/1990 | Boggan | |
| 4,953,085 A | 8/1990 | Atkins | |
| 4,954,985 A | 9/1990 | Yamazaki | |
| 4,961,142 A | 10/1990 | Elliott et al. | |
| 4,968,873 A | 11/1990 | Dethloff et al. | |
| 4,975,840 A | 12/1990 | DeTore et al. | |
| 4,978,401 A | 12/1990 | Bonomi | |
| 4,992,940 A | 2/1991 | Dworkin | |
| 5,025,372 A | 6/1991 | Burton et al. | |
| 5,049,728 A | 9/1991 | Rovin | |
| 5,055,662 A | 10/1991 | Hasegawa | |
| 5,080,748 A | 1/1992 | Bonomi | |
| 5,095,194 A | 3/1992 | Barbanell | |
| 5,117,355 A | 5/1992 | McCarthy | |
| 5,146,068 A | 9/1992 | Ugawa et al. | |
| 5,175,416 A | 12/1992 | Mansvelt | |
| 5,180,901 A | 1/1993 | Hiramatsu | |
| 5,192,947 A | 3/1993 | Neustein | |
| 5,202,286 A | 4/1993 | Nakatani | |
| 5,202,826 A | 4/1993 | McCarthy | |
| 5,206,488 A | 4/1993 | Teicher | |
| 5,206,803 A | 4/1993 | Vitagliano | |
| 5,214,700 A | 5/1993 | Pinkas et al. | |
| 5,218,631 A | 6/1993 | Katz | |
| 5,247,190 A | 9/1993 | Friend et al. | |
| 5,276,311 A | 1/1994 | Hennige et al. | |
| 5,287,268 A | 2/1994 | McCarthy | |
| 5,287,269 A | 2/1994 | Dorrough et al. | |
| 5,297,026 A | 3/1994 | Hoffman | |
| 5,311,594 A | 5/1994 | Penzias | |
| 5,326,959 A | 7/1994 | Perazza | |
| 5,326,960 A | 7/1994 | Tannenbaum | |
| 5,328,809 A | 7/1994 | Holmes et al. | |
| 5,339,239 A | 8/1994 | Manabe et al. | |
| 5,349,633 A | 9/1994 | Katz | |
| 5,350,906 A | 9/1994 | Brody et al. | |
| 5,359,183 A | 10/1994 | Skodlar | |
| 5,361,062 A | 11/1994 | Weiss et al. | |
| 5,365,575 A | 11/1994 | Katz | |
| 5,383,113 A | 1/1995 | Knight | |
| 5,397,881 A | 3/1995 | Mannik | |
| 5,399,502 A | 3/1995 | Friend et al. | |
| 5,401,827 A | 3/1995 | Holmes et al. | |
| RE34,915 E | 4/1995 | Nichtberger et al. | |
| 5,424,524 A | 6/1995 | Ruppert et al. | |
| 5,450,477 A | 9/1995 | Amarant et al. | |
| 5,453,601 A | 9/1995 | Rosen | |
| 5,455,407 A | 10/1995 | Rosen | |
| 5,457,305 A | 10/1995 | Akel et al. | |
| 5,459,306 A | 10/1995 | Stein et al. | |
| 5,465,206 A | 11/1995 | Hilt et al. | |
| 5,466,919 A | 11/1995 | Hovakimimian | |
| 5,471,669 A | 11/1995 | Lidman | |
| 5,477,038 A | 12/1995 | Levine et al. | |
| 5,477,040 A | 12/1995 | Lalonde | |
| 5,479,494 A | 12/1995 | Clitherow | |
| 5,482,139 A | 1/1996 | Rivalto | |
| 5,483,444 A | 1/1996 | Malark | |
| 5,483,445 A | 1/1996 | Pickering | |
| 5,500,514 A | 3/1996 | Veeneman et al. | |
| 5,511,114 A | 4/1996 | Stimson et al. | |
| 5,512,654 A | 4/1996 | Holmes et al. | |
| 5,513,102 A | 4/1996 | Auriemma | |
| 5,521,363 A | 5/1996 | Tannenbaum | |
| 5,521,813 A | 5/1996 | Fox et al. | |
| 5,530,232 A | 6/1996 | Taylor | |
| 5,530,235 A | 6/1996 | Stefik et al. | |
| 5,537,314 A | 7/1996 | Kanter | |
| 5,544,086 A | 8/1996 | Davis et al. | |
| 5,544,246 A | 8/1996 | Mandelbaum et al. | |
| 5,553,120 A | 9/1996 | Katz | |
| 5,577,109 A | 11/1996 | Stimson et al. | |
| 5,578,808 A | 11/1996 | Taylor | |
| 5,581,064 A | 12/1996 | Riley et al. | |
| 5,585,787 A | 12/1996 | Wallerstein | |
| 5,590,038 A | 12/1996 | Pitroda | |
| 5,592,560 A | 1/1997 | Deaton et al. | |
| 5,604,542 A | 2/1997 | Dedrick | |
| 5,608,785 A | 3/1997 | Kasday | |
| 5,612,868 A | 3/1997 | Off | |
| 5,621,787 A | 4/1997 | McKoy et al. | |
| 5,621,812 A | 4/1997 | Deaton et al. | |
| 5,627,973 A | 5/1997 | Armstrong et al. | |
| 5,630,127 A * | 5/1997 | Moore et al. | 707/103 R |
| 5,637,845 A | 6/1997 | Kolls | |
| 5,638,457 A | 6/1997 | Deaton et al. | |
| 5,642,279 A | 6/1997 | Stone | |
| 5,642,485 A | 6/1997 | Deaton et al. | |
| 5,644,723 A | 7/1997 | Deaton et al. | |
| 5,644,727 A | 7/1997 | Atkins | |
| 5,649,114 A | 7/1997 | Deaton et al. | |
| 5,649,117 A | 7/1997 | Landry | |
| 5,649,118 A | 7/1997 | Carlisle et al. | |
| 5,653,914 A | 8/1997 | Holmes et al. | |
| 5,659,741 A | 8/1997 | Eberhardt | |
| 5,664,110 A | 9/1997 | Green et al. | |
| 5,664,157 A | 9/1997 | Takahira et al. | |
| 5,665,953 A | 9/1997 | Mazzamuto | |
| 5,672,678 A | 9/1997 | Holmes et al. | |
| 5,675,607 A | 10/1997 | Alesio et al. | |
| 5,675,662 A | 10/1997 | Deaton et al. | |
| 5,677,955 A | 10/1997 | Doggett et al. | |
| 5,684,291 A | 11/1997 | Taskett | |
| 5,687,322 A | 11/1997 | Deaton et al. | |
| 5,689,100 A | 11/1997 | Carrithers et al. | |
| 5,689,650 A | 11/1997 | McClelland et al. | |
| 5,692,132 A | 11/1997 | Hogan | |
| 5,696,907 A | 12/1997 | Tom | |
| 5,699,528 A | 12/1997 | Hogan | |
| 5,703,344 A | 12/1997 | Bezy et al. | |
| 5,704,046 A | 12/1997 | Hogan | |
| 5,705,798 A | 1/1998 | Tarbox | |
| 5,708,422 A | 1/1998 | Blonder et al. | |
| 5,710,458 A | 1/1998 | Iwasaki | |
| 5,710,886 A | 1/1998 | Christensen et al. | |
| 5,710,887 A | 1/1998 | Chelliah et al. | |
| 5,710,889 A | 1/1998 | Clark et al. | |
| 5,715,399 A | 2/1998 | Bezos | |
| 5,717,925 A | 2/1998 | Harper et al. | |
| 5,721,768 A | 2/1998 | Stimson et al. | |
| 5,721,781 A | 2/1998 | Deo et al. | |

| | | | | | |
|---|---|---|---|---|---|
| 5,726,884 A | 3/1998 | Sturgeon et al. | 5,897,620 A | 4/1999 | Walker et al. |
| 5,727,153 A | 3/1998 | Powell | 5,905,246 A | 5/1999 | Fajkowski |
| 5,728,998 A | 3/1998 | Novis et al. | 5,907,350 A | 5/1999 | Nemirofsky |
| 5,729,693 A | 3/1998 | Holda-Fleck | 5,911,135 A | 6/1999 | Atkins |
| 5,734,154 A | 3/1998 | Jachimowicz et al. | 5,911,136 A | 6/1999 | Atkins |
| 5,734,838 A | 3/1998 | Robinson | 5,914,472 A | 6/1999 | Foladare et al. |
| 5,736,728 A | 4/1998 | Matsubara | 5,920,629 A | 7/1999 | Rosen |
| 5,737,421 A | 4/1998 | Audebert | 5,920,844 A | 7/1999 | Hotta et al. |
| 5,740,549 A | 4/1998 | Reilly et al. | 5,920,847 A | 7/1999 | Kolling et al. |
| 5,742,775 A | 4/1998 | King | 5,923,734 A | 7/1999 | Taskett |
| 5,745,049 A | 4/1998 | Akiyama et al. | 5,926,800 A | 7/1999 | Baronowski et al. |
| 5,745,706 A | 4/1998 | Wolfberg et al. | 5,930,217 A | 7/1999 | Kayanuma |
| 5,749,075 A | 5/1998 | Toader et al. | 5,930,762 A | 7/1999 | Masch |
| 5,760,381 A | 6/1998 | Stich et al. | 5,931,764 A | 8/1999 | Freeman et al. |
| 5,765,138 A | 6/1998 | Aycock et al. | 5,933,817 A | 8/1999 | Hucal |
| 5,765,141 A | 6/1998 | Spector | 5,937,068 A | 8/1999 | Audebert |
| 5,770,843 A | 6/1998 | Rose et al. | 5,940,811 A | 8/1999 | Norris |
| 5,770,849 A | 6/1998 | Novis et al. | 5,952,641 A | 9/1999 | Korshun |
| 5,774,870 A | 6/1998 | Storey | 5,953,423 A | 9/1999 | Rosen |
| 5,777,305 A | 7/1998 | Smith et al. | 5,953,710 A | 9/1999 | Fleming |
| 5,777,306 A | 7/1998 | Masuda | 5,955,961 A | 9/1999 | Wallerstein |
| 5,777,903 A | 7/1998 | Piosenka et al. | 5,956,691 A | 9/1999 | Powers |
| 5,778,067 A | 7/1998 | Jones et al. | 5,956,695 A | 9/1999 | Carrithers et al. |
| 5,787,156 A | 7/1998 | Katz | 5,963,648 A | 10/1999 | Rosen |
| 5,787,404 A | 7/1998 | Fernandez-Holman | 5,970,479 A | 10/1999 | Shepherd |
| 5,789,733 A | 8/1998 | Jachimowicz et al. | 5,970,480 A | 10/1999 | Kalina |
| 5,794,207 A | 8/1998 | Walker | 5,974,399 A | 10/1999 | Giuliani et al. |
| 5,798,950 A | 8/1998 | Fitzgerald | RE36,365 E | 11/1999 | Levine et al. |
| 5,799,087 A | 8/1998 | Rosen | 5,984,180 A | 11/1999 | Albrecht |
| 5,802,176 A | 9/1998 | Audebert | 5,984,191 A | 11/1999 | Chapin, Jr. |
| 5,805,719 A | 9/1998 | Pare et al. | 5,987,434 A | 11/1999 | Libman |
| 5,806,042 A | 9/1998 | Kelly et al. | 5,988,509 A | 11/1999 | Taskett |
| 5,806,044 A | 9/1998 | Powell | 5,991,413 A | 11/1999 | Arditti et al. |
| 5,806,045 A | 9/1998 | Biorge | 5,991,743 A | 11/1999 | Irving et al. |
| 5,807,627 A | 9/1998 | Friend et al. | 5,991,748 A | 11/1999 | Taskett |
| 5,809,478 A | 9/1998 | Greco | 5,991,750 A | 11/1999 | Watson |
| 5,813,009 A | 9/1998 | Johnson et al. | 5,999,596 A | 12/1999 | Walker et al. |
| 5,815,657 A | 9/1998 | Williams et al. | 6,000,608 A | 12/1999 | Dorf |
| 5,815,658 A | 9/1998 | Kuriyama | 6,000,832 A | 12/1999 | Franklin et al. |
| 5,819,234 A | 10/1998 | Slavin et al. | 6,002,383 A | 12/1999 | Shimada |
| 5,819,237 A | 10/1998 | Garman | 6,003,762 A | 12/1999 | Hayashida |
| 5,826,243 A | 10/1998 | Musmanno et al. | 6,004,681 A | 12/1999 | Epstein et al. |
| 5,832,457 A | 11/1998 | O'Brien | 6,006,988 A | 12/1999 | Behrmann et al. |
| 5,832,488 A | 11/1998 | Eberhardt | 6,009,415 A | 12/1999 | Shurling et al. |
| 5,835,061 A | 11/1998 | Stewart | 6,014,636 A | 1/2000 | Reeder |
| 5,835,576 A | 11/1998 | Katz | 6,014,638 A | 1/2000 | Burge et al. |
| 5,839,113 A | 11/1998 | Federau et al. | 6,014,645 A | 1/2000 | Cunningham |
| 5,845,259 A | 12/1998 | West et al. | 6,014,749 A | 1/2000 | Gloor et al. |
| 5,845,260 A | 12/1998 | Nakano et al. | 6,016,482 A | 1/2000 | Molinari et al. |
| 5,852,811 A | 12/1998 | Atkins | 6,016,954 A | 1/2000 | Abe et al. |
| 5,852,812 A | 12/1998 | Reeder | 6,018,722 A | 1/2000 | Ray et al. |
| 5,857,079 A | 1/1999 | Claus et al. | 6,019,284 A | 2/2000 | Freeman et al. |
| 5,857,175 A | 1/1999 | Day et al. | 6,026,370 A | 2/2000 | Jermyn |
| 5,857,709 A | 1/1999 | Chock | 6,029,139 A | 2/2000 | Cunningham et al. |
| 5,859,419 A | 1/1999 | Wynn | 6,029,144 A | 2/2000 | Barrett et al. |
| 5,864,609 A | 1/1999 | Cross et al. | 6,029,890 A | 2/2000 | Austin |
| 5,864,828 A | 1/1999 | Atkins | 6,032,136 A | 2/2000 | Brake, Jr. et al. |
| 5,864,830 A | 1/1999 | Armetta et al. | 6,036,099 A | 3/2000 | Leighton |
| RE36,116 E | 2/1999 | McCarthy | 6,038,292 A | 3/2000 | Thomas |
| 5,870,718 A | 2/1999 | Spector | 6,038,537 A | 3/2000 | Matsuoka |
| 5,870,721 A | 2/1999 | Norris | 6,038,552 A | 3/2000 | Fleischl et al. |
| 5,875,437 A | 2/1999 | Atkins | 6,041,315 A | 3/2000 | Pollin |
| 5,883,377 A | 3/1999 | Chapin, Jr. | 6,045,042 A | 4/2000 | Ohno |
| 5,883,810 A | 3/1999 | Franklin et al. | 6,047,067 A | 4/2000 | Rosen |
| 5,884,271 A | 3/1999 | Pitroda | 6,047,268 A | 4/2000 | Bartoli et al. |
| 5,884,278 A | 3/1999 | Powell | 6,049,463 A | 4/2000 | O'Malley et al. |
| 5,884,285 A | 3/1999 | Atkins | 6,049,773 A | 4/2000 | McCormack et al. |
| 5,884,287 A | 3/1999 | Edesess | 6,049,782 A | 4/2000 | Gottesman et al. |
| 5,887,065 A | 3/1999 | Audebert | 6,058,378 A | 5/2000 | Clark et al. |
| 5,890,138 A | 3/1999 | Godin et al. | 6,064,985 A | 5/2000 | Anderson |
| 5,890,140 A | 3/1999 | Clark et al. | 6,065,675 A | 5/2000 | Teicher |
| H1794 H | 4/1999 | Claus | 6,068,183 A | 5/2000 | Freeman et al. |
| 5,893,079 A | 4/1999 | Cwenar | 6,070,067 A | 5/2000 | Nguyen et al. |

| | | |
|---|---|---|
| 6,070,147 A | 5/2000 | Harms et al. |
| 6,070,153 A | 5/2000 | Simpson |
| 6,076,068 A | 6/2000 | DeLapa et al. |
| 6,076,072 A | 6/2000 | Libman |
| 6,078,888 A | 6/2000 | Johnson, Jr. |
| 6,078,891 A | 6/2000 | Riordan et al. |
| 6,078,904 A | 6/2000 | Rebane |
| 6,088,678 A | 7/2000 | Shannon |
| 6,091,817 A | 7/2000 | Bertina et al. |
| 6,092,056 A | 7/2000 | Tull, Jr. et al. |
| 6,095,412 A | 8/2000 | Bertina et al. |
| 6,095,416 A | 8/2000 | Grant et al. |
| 6,098,053 A | 8/2000 | Slater |
| 6,105,011 A | 8/2000 | Morrison, Jr. |
| 6,105,865 A | 8/2000 | Hardesty |
| 6,109,525 A | 8/2000 | Blomqvist et al. |
| 6,112,191 A | 8/2000 | Burke |
| 6,115,458 A | 9/2000 | Taskett |
| 6,119,097 A | 9/2000 | Ibarra |
| 6,119,103 A | 9/2000 | Basch et al. |
| 6,119,932 A | 9/2000 | Maloney et al. |
| 6,122,623 A | 9/2000 | Garman |
| 6,128,598 A | 10/2000 | Walker et al. |
| 6,128,599 A | 10/2000 | Walker et al. |
| 6,129,274 A | 10/2000 | Suzuki |
| 6,134,536 A | 10/2000 | Shepherd |
| 6,138,917 A | 10/2000 | Chapin, Jr. |
| 6,145,741 A | 11/2000 | Wisdom et al. |
| 6,148,297 A | 11/2000 | Swor et al. |
| 6,161,096 A | 12/2000 | Bell |
| 6,163,770 A | 12/2000 | Gamble et al. |
| 6,164,533 A | 12/2000 | Barton |
| 6,167,385 A | 12/2000 | Hartley-Urquhart |
| 6,169,975 B1 | 1/2001 | White et al. |
| 6,173,267 B1 | 1/2001 | Cairns |
| 6,182,048 B1 | 1/2001 | Osborn et al. |
| 6,182,894 B1 | 2/2001 | Hackett et al. |
| 6,186,793 B1 | 2/2001 | Brubaker |
| 6,189,787 B1 | 2/2001 | Dorf |
| 6,192,113 B1 | 2/2001 | Lorsch |
| 6,195,644 B1 | 2/2001 | Bowie |
| 6,202,053 B1 | 3/2001 | Christiansen et al. |
| RE37,122 E | 4/2001 | Levine et al. |
| 6,223,143 B1 | 4/2001 | Weinstock et al. |
| 6,227,447 B1 | 5/2001 | Campisano |
| 6,243,688 B1 | 6/2001 | Kalina |
| 6,263,316 B1 | 7/2001 | Khan et al. |
| 6,265,977 B1 | 7/2001 | Vega et al. |
| 6,278,981 B1 | 8/2001 | Dembo et al. |
| 6,295,522 B1 | 9/2001 | Boesch |
| 6,298,336 B1 | 10/2001 | Davis et al. |
| 6,308,268 B1 | 10/2001 | Audebert |
| 6,330,546 B1 | 12/2001 | Gopinathan et al. |
| 6,334,192 B1 * | 12/2001 | Karpf ............... 714/1 |
| 6,336,099 B1 | 1/2002 | Barnett et al. |
| 6,338,048 B1 | 1/2002 | Mori |
| 6,341,724 B2 | 1/2002 | Campisano |
| 6,343,743 B1 | 2/2002 | Lamla |
| 6,345,261 B1 | 2/2002 | Feidelson |
| 6,345,766 B1 | 2/2002 | Taskett et al. |
| 6,349,291 B1 | 2/2002 | Varma |
| 6,360,954 B1 | 3/2002 | Barnardo |
| 6,366,220 B1 | 4/2002 | Elliott |
| 6,373,969 B1 | 4/2002 | Adler |
| 6,377,669 B1 | 4/2002 | Walker et al. |
| 6,385,591 B1 | 5/2002 | Mankoff |
| 6,386,444 B1 | 5/2002 | Sullivan |
| 6,397,202 B1 * | 5/2002 | Higgins et al. ............... 706/47 |
| 6,402,039 B1 | 6/2002 | Freeman et al. |
| 6,405,182 B1 | 6/2002 | Cuervo |
| 6,422,459 B1 | 7/2002 | Kawan |
| 6,424,462 B1 | 7/2002 | Cohen |
| 6,424,029 B1 | 7/2002 | Giesler |
| 6,429,927 B1 | 8/2002 | Borza |
| 6,434,259 B1 | 8/2002 | Hamid et al. |
| 6,446,210 B1 | 9/2002 | Borza |
| 6,450,407 B1 | 9/2002 | Freeman et al. |
| 6,463,039 B1 | 10/2002 | Ricci et al. |
| 6,467,684 B2 | 10/2002 | Fite et al. |
| 6,473,500 B1 | 10/2002 | Risafi et al. |
| 6,484,144 B2 | 11/2002 | Martin et al. |
| 6,484,148 B1 | 11/2002 | Boyd |
| 6,498,861 B1 | 12/2002 | Hamid et al. |
| 6,505,168 B1 | 1/2003 | Rothman et al. |
| 6,505,780 B1 | 1/2003 | Yassin et al. |
| 6,529,880 B1 | 3/2003 | McKeen et al. |
| 6,557,750 B1 | 5/2003 | Druse et al. |
| 6,560,578 B2 | 5/2003 | Eldering |
| 6,574,603 B1 | 6/2003 | Dickson et al. |
| 6,581,839 B1 | 6/2003 | Lasch et al. |
| 6,601,040 B1 | 7/2003 | Kolls |
| 6,601,761 B1 | 8/2003 | Katis |
| 6,609,111 B1 | 8/2003 | Bell |
| RE38,255 E | 9/2003 | Levine et al. |
| 6,615,189 B1 | 9/2003 | Phillips et al. |
| 6,615,190 B1 | 9/2003 | Slater |
| 6,625,582 B2 | 9/2003 | Richman et al. |
| 6,631,849 B2 | 10/2003 | Blossom |
| 6,641,049 B2 | 11/2003 | Luu |
| 6,641,050 B2 | 11/2003 | Kelley et al. |
| 6,671,673 B1 | 12/2003 | Baseman et al. |
| 6,675,127 B2 | 1/2004 | LaBlanc et al. |
| 6,675,149 B1 | 1/2004 | Ruffin et al. |
| 6,687,222 B1 | 2/2004 | Albert et al. |
| 6,693,544 B1 | 2/2004 | Hebbecker |
| 6,742,704 B2 | 6/2004 | Fitzmaurice et al. |
| 6,745,938 B2 | 6/2004 | Sullivan |
| 6,757,660 B2 | 6/2004 | Canada et al. |
| 6,757,710 B2 | 6/2004 | Reed |
| 6,802,008 B1 | 10/2004 | Ikefuji et al. |
| 6,805,287 B2 | 10/2004 | Bishop |
| 6,865,547 B1 | 3/2005 | Brake, Jr. et al. |
| 6,868,426 B1 | 3/2005 | Mankoff |
| 6,876,971 B1 | 4/2005 | Burke |
| 6,895,386 B1 | 5/2005 | Bachman et al. |
| 6,901,372 B1 | 5/2005 | Helzerman |
| 6,912,502 B1 * | 6/2005 | Buddle et al. ............... 705/1 |
| 6,970,830 B1 | 11/2005 | Samra et al. |
| 6,999,943 B1 | 2/2006 | Johnson et al. |
| 7,006,992 B1 | 2/2006 | Packwood |
| 7,051,925 B2 | 5/2006 | Schwarz, Jr. |
| 7,072,864 B2 | 7/2006 | Brake, Jr. et al. |
| 7,089,503 B1 | 8/2006 | Bloomquist et al. |
| 7,104,443 B1 | 9/2006 | Paul et al. |
| 7,113,914 B1 | 9/2006 | Spielmann et al. |
| 7,165,049 B2 | 1/2007 | Slater |
| 2001/0011227 A1 | 8/2001 | Ashery et al. |
| 2001/0011243 A1 | 8/2001 | Dembo et al. |
| 2001/0027441 A1 | 10/2001 | Wankmueller |
| 2001/0034682 A1 | 10/2001 | Knight et al. |
| 2001/0037315 A1 | 11/2001 | Saliba et al. |
| 2001/0044293 A1 | 11/2001 | Morgan |
| 2001/0047342 A1 | 11/2001 | Cuervo |
| 2001/0054003 A1 | 12/2001 | Chien et al. |
| 2001/0056398 A1 | 12/2001 | Scheirer |
| 2002/0019803 A1 | 2/2002 | Muller |
| 2002/0026418 A1 | 2/2002 | Koppel et al. |
| 2002/0046255 A1 | 4/2002 | Moore et al. |
| 2002/0059093 A1 * | 5/2002 | Barton et al. ............... 705/10 |
| 2002/0062235 A1 | 5/2002 | Wahlbin et al. |
| 2002/0077978 A1 | 6/2002 | O'Leary et al. |
| 2002/0091572 A1 | 7/2002 | Anderson et al. |
| 2002/0091631 A1 | 7/2002 | Usui |
| 2002/0095365 A1 | 7/2002 | Slavin et al. |
| 2002/0104878 A1 | 8/2002 | Seifert et al. |
| 2002/0116271 A1 | 8/2002 | Mankoff |

| | | | |
|---|---|---|---|
| 2002/0116330 A1 | 8/2002 | Hed et al. | |
| 2002/0120627 A1 | 8/2002 | Mankoff | |
| 2002/0120642 A1 | 8/2002 | Fetherston | |
| 2002/0143703 A1 | 10/2002 | Razvan et al. | |
| 2002/0147662 A1 | 10/2002 | Anderson | |
| 2002/0165820 A1 | 11/2002 | Anvekar et al. | |
| 2002/0174016 A1 | 11/2002 | Cuervo | |
| 2002/0194081 A1 | 12/2002 | Perkowski | |
| 2003/0004828 A1 | 1/2003 | Epstein | |
| 2003/0023549 A1 | 1/2003 | Armes et al. | |
| 2003/0028518 A1 | 2/2003 | Mankoff | |
| 2003/0033211 A1 | 2/2003 | Haines et al. | |
| 2003/0033246 A1 | 2/2003 | Slater | |
| 2003/0046249 A1 | 3/2003 | Wu | |
| 2003/0053609 A1 | 3/2003 | Risafi et al. | |
| 2003/0101119 A1 | 5/2003 | Persons et al. | |
| 2003/0105672 A1 | 6/2003 | Epstein et al. | |
| 2003/0135462 A1 | 7/2003 | Brake, Jr. et al. | |
| 2003/0140004 A1 | 7/2003 | O'Leary et al. | |
| 2003/0144935 A1 | 7/2003 | Sobek | |
| 2003/0154125 A1 | 8/2003 | Mittal et al. | |
| 2003/0163403 A1 | 8/2003 | Chen et al. | |
| 2003/0163416 A1 | 8/2003 | Kitajima | |
| 2003/0172040 A1 | 9/2003 | Kemper et al. | |
| 2003/0195808 A1 | 10/2003 | Brown et al. | |
| 2003/0200143 A9 | 10/2003 | Walker et al. | |
| 2003/0200180 A1 | 10/2003 | Phelan et al. | |
| 2003/0216965 A1 | 11/2003 | Libman | |
| 2004/0024672 A1 | 2/2004 | Brake, Jr. et al. | |
| 2004/0030626 A1 | 2/2004 | Libman | |
| 2004/0039588 A1 | 2/2004 | Libman | |
| 2004/0059952 A1 | 3/2004 | Newport et al. | |
| 2004/0093296 A1 | 5/2004 | Phelan et al. | |
| 2004/0093303 A1 | 5/2004 | Picciallo | |
| 2004/0098351 A1 | 5/2004 | Duke | |
| 2004/0128186 A1 | 7/2004 | Breslin et al. | |
| 2004/0243498 A1 | 12/2004 | Duke | |
| 2005/0021400 A1 | 1/2005 | Postrel | |
| 2005/0027649 A1 | 2/2005 | Cech | |
| 2005/0071230 A1 | 3/2005 | Mankoff | |
| 2005/0075932 A1 | 4/2005 | Mankoff | |
| 2005/0077350 A1 | 4/2005 | Courtion et al. | |
| 2005/0091138 A1 | 4/2005 | Awatsu | |
| 2005/0171898 A1 | 8/2005 | Bishop et al. | |
| 2006/0047589 A1 | 3/2006 | Grau | |

FOREIGN PATENT DOCUMENTS

| | | | |
|---|---|---|---|
| EP | 0843292 A2 | 5/1998 | |
| EP | 0855659 | 7/1998 | |
| EP | 959440 | 11/1999 | |
| GB | 2275654 A | 9/1994 | |
| GB | 2376787 | 12/2002 | |
| GB | 2377071 | 12/2002 | |
| GB | 2377314 | 1/2003 | |
| WO | WO 94/29112 | 12/1994 | |
| WO | WO 97/41673 | 11/1997 | |
| WO | WO 98/11477 A2 * | 3/1998 | |
| WO | WO 98/59307 | 12/1998 | |
| WO | WO 99/05633 | 2/1999 | |
| WO | WO 9905598 | 2/1999 | |
| WO | WO 01/18699 | 3/2001 | |
| WO | WO 01/69347 | 9/2001 | |
| WO | WO 01/69347 A2 | 9/2001 | |
| WO | WO 01/69347 A3 | 9/2001 | |
| WO | WO 2005/043277 A3 | 5/2005 | |

OTHER PUBLICATIONS

Duden, From Data to Decisions: Selecting Risk Management Software, Risk Management, vol. 43, Issue 12, Dec. 1996, p. 33-35 [PROQUEST].*

Barr, Developing a Risk-Based Compliance Monitoring System, ABA Bank Compliance, vol. 15, Issue 10, Oct. 1994, start p. 27 [PROQUEST].*

Y. Breitbart, et al., "Merging Application-centric and Data-centric Approaches to Support Transaction—oriented Multi-system Workflows," pp. 1-7.

Douglas O. Cook, et al., "Productivity and Efficiency in Insurance: An Overview of the Issues," Wharton Financial Institutions Center, Oct. 11, 1994, Pennsylvania.

International Search Report dated Apr. 9, 2002.

5500 - FDIC General Counsel's Opinion No. 8 - Stored Value Cards, 61 Fed. Reg. 40490, http://www.fdic.gov/regulations/laws/rules/5500-500.html, Aug. 2, 1996.

Song, A Card That Asks For ID, Time Magazine, Apr. 12, 2004, 1 page.

A Store Card Issuer Looks for Lift from Electronic Gift Certificates, Credit Card News, Feb. 1, 1995, 2 pages.

Claessens, et al., A Tangled World Wide Web of Security Issues, First Monday, retrieved from the internet at http://www.firstmonday.org/issue7_3/claessens, retrieved from the internet on Oct. 6, 2006.

Hotchkiss, ATM's at the head of their class, Bank Marketing, vol. 29, No. 3, Mar. 1997, pp. 26-32.

Edwards, ATMs The Hot New Media Buy, ABA Banking Journal, Mar. 1999, pp. 58, 60.

American Express Incentive Services, Incentive, Sep. 1996, p. 126.

Fickenscher, Amex Prepaid Offering is Latest Card for Firms Regarding Employees, American Banker, vol. 161, No. 151, Aug. 8, 1996, pp. 1-2.

Neumann, An Enhanced Neural Network Technique for Software Risk Analysis, IEEE Transactions on Software Engineering, vol. 28, No. 9, Sep. 1, 2002, pp. 904-912.

Associates First Capital Corporation, Hoover's Inc., The Industry Standard: The Newsmagazine of the Internet Economy, thestandard.net/companies/company-display, Apr. 6, 1999.

Award Card Comparison, JA7922,

Brehl, Banks issue cash-card pledge, The Toronto Star, Oct. 9, 1997, 1 page.

Blockbuster running test of a stored value card, The American Banker, Sep. 1, 1995.

Meece, Boatman's Prepaid Cards for Worker-Incentive Firm, American Banker, Jul. 2, 1996, p. 12.

Boatmen's Floats Stored Value into the Employee Incentive Waters, Debit Card News, vol. 2, Issue 2, Jul. 16, 1996, 3 pages.

CES/NaBANCO introduces stored values card technology blockbuster video is first merchant partner, Business Wire, Inc., Jan. 15, 1996.

Card Based Award Systems, JA8309.

CardEx Incentives, www.cardex.com, Apr. 6, 1999.

CardFlash, Apr. 5, 2005.

Vandenengel, Cards on the Internet: Advertising on a $3 Bill, Industry Intelligence, Feb. 1, 1995, pp. 46-48.

Kutler, Card Cash Creator Looking Beyond Mondex, Feb. 9, 1995.

Rosen, Cash Just Isn't Flexible Enough: Shops of the Future Will Only Take Cards, Daily Express, Technology Section, Feb. 10, 1995, 1 page.

Bank, Cash, Check, Charge—What's Next?, Seattle Times, Mar. 6, 1995.

Morgan et al., Categorizing Risks for Risk Ranking, vol. 20, No. 1, Jun. 22, 2005, pp. 49-58.

Common electronic purse specifications, Business Requirements, Version 6.0, Dec. 1998.

Guidotti, Comparing Environment risks: A Consultative Approach to Setting Priorities at the Community Level, Public Health Rev 1994, vol. 22, Jun. 16, 2005, pp. 321-337.

Britt, Competing in Auto Lending, America's Community Banker, vol. 5, No. 11, Nov. 1, 1996, pp. 33-37.

Consortium created to manage common electronic purse specification, Cardtech Securtech, Chicago, www.visa.com/av/news/PRmisc051199.vhtml, May 11, 1999.

Nora Wood, Corporate Spotlight, Incentive, Dec. 1997, 4 pages.

Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.

Lamond, Credit Card Transactions Real World and Online, Paying by Credit Card-Real World and Online, http://www.virtualschool.edu/mon/ElectronicProperty/kiamond/credit, printed Jul. 8, 2005, 17 pages.

D.C. Area Safeway Stores Look for Increase in Sales Volume and Revenue with Cards, Card News, vol. 6, No. 25, Dec. 30, 1991, pp.7-9.

Piskora, Debit Cards Seen Poised for New Markets, American Banker, Credit/Debit/ATMs, Mar. 7, 1995, p. 16.

E-Z Pass, Web page, http://www.ezpass.com-Disc_portNewYork.html, Nov. 12, 2001.

E-Z Pass, Web page, http:\\www.ezpass.com-Disc_ny_annual.html, Nov. 12, 2001.

E-Z Pass, Web page, http\\www.ezpass.com-frameMain.html, Nov. 12, 2001.

E-Z Pass, Web page, http:\\www.ezpass.com-whatis.html, Nov. 12, 2001.

Eight Keys to Making the Right Choice, Incentive, Dec. 1996, 9 pages.

D. O'Mahony, Electronic Payment System, 1997, Artech House, XP002137255, p. 7-11.

Business Times, Electronic Purse Can Free You From ATM Drag, Business Times, www.btimes.co.za, printed Feb. 23, 2001, 1 page.

Electronic Purse, SCIA (Smart Card Industry Association), About Smart Cards, www.scia.org.printed Feb. 23, 2001, 1 page.

Sanchez-Klein, Electronic purse alliance planned, Computerworld Online News, Jul. 29, 1998, printed Feb. 23, 2001, 2 pages.

Electronic purse card to be launched tomorrow, New Straits Times, News Clippings, Sep. 18, 1999, printed Feb. 23, 2001, 3 pages.

Exclusively Yours From Maritz . . . The MasterCard Ultimate Incentive, Incentive, Oct. 1995, 3 pages.

Block, First Data Subsidiary Creates Payroll Card for the Bankless, LexisNexis Academic, Credit/Debit/ATMs, p. 10, Mar. 21, 1997.

First Data markets stored-value cards, Cards International, Jan. 30, 1996, p. 5.

First USA - Activate Today and Get One Hour Free Calling Card Calls, Call 1-800-555-2535, First USA, 6 pages.

First USA - Call 1(800)335-2453 To Receive One Hour of Domestic Long Distance Calling (No Strings Attached), First USA, 6 pages.

First USA Platinum Connect, First USA Bank, First USA Promotional Mailing, Oct. 1997, 6 pages.

First Union Issues Smart Cards to Fort Benning Recruits, CardFax, vol. 1999, No. 60, Mar. 26, 1999, 1 page.

Norris, First data unit develops blockbuster cash card, Omaha World Hearld Sunrise Edition, Business Section, Jan. 19, 1996, p. 16.

Frequently asked questions, ECARD, www.eregard.com, printed Sep. 23, 2001, 7 pages.

Glossman, et al.,, Glossman, et al., Citicorp Company Report, Report No. 1647151, p. 8 of 16.

Machlis, Have it the smart way: Burger King program drives smart-card use, Computerworld, printed Feb. 23, 2001, 1 page.

Here's the calling convenience you asked for: 1-800-call-ATT . . . For All Calls, AT&T, Appendix A: For Card Carriers, 1999, 7 pages.

Hoovers, General Mills, Inc. Corporate Profile relied upon to show the history of the company, http:/cobrands.hoovers.com/global/cobrands/proquest/history.xhtml?COID=10639, Jul. 12, 2005, 2 pages.

How Is It Different?, JA8331.

Konrad, IBM Had a Bunch of Unusual Ideas in 2003, www.philly.com, printed Jan. 21, 2004, posted on Jan. 13, 2004, 2 pages.

Incenticard, Bellsouth, JA8329.

Judy Quinn, Incentive Cards Explained, Incentive, Dec. 1995, 5 pages.

Incentive Firms Find Debit Cards A Rewarding Experience (Off-line debit card issuers converge efforts with companies looking for effective incentives to boost employee productivity and to motivate individuals to buy their products), Debit Card News, vol.

Vincent Alonzo, Incentive Marketing . . . Three If By Smart Card, Incentive Sep. 1995, p. 11.

Incentive gift Card: Another way to give the gift of choice!, Incentive, Aug. 1995, 2 pages.

Coulton, Incentives Field Moving to Card-Based Series 14, American Banker, Mar. 26, 1998, 3 pages.

Introducing SpendingMoney(TM), Armetta: Marketing & Design Product Concept Report, Oct. 9, 1996, 15 pages.

Introducing the First USA Platinum Connect Card, First USA Promotional Mailing, Dec. 1997, 2 pages.

Key Bank Holiday Offer, http://www.key.com/swiftgift/home.html, printed Apr. 5, 1999.

LexisNexis Academic, Debit Card Innovation, vol. XXXV, No. 5, p. 2, May 1997.

LexisNexis Academic, Debit Cards: Payroll Card Ups Fees, Future Banker, p. 18, Oct. 6, 1997.

LexisNexis Academic, NTS' TransPay Debit Card Helps Remote and Unbanked Employees Get Funds Quicker, Financial News, Mar. 18, 1997.

MailFrontier Survey Finds that Consumers Hold Financial Institutions Accountable for Online Identity Theft, www.mailfrontier.com, Palo Alto, CA, Nov. 2004.

O'Conner, Maritz Gets MasterCard's Stamp of Approval, Business Travel News, Aug. 19, 1996, 2 pages.

Maritz, Incentive, Jun. 1996, p. 111.

Meridian Award Cards, JA8251.

Meridian-the leader in card marketing, JA8343.

Meridicard vs. Debit Cards, JA7917.

Clark, Microsoft, Visa to Jointly Develop PC Electronic-Shopping Software, The Wall Street Journal, Nov. 9, 1994, Nov. 9, 1994 WSJ B9.

More Retailers Turn to Co-Branding, Chain Store Age Executive with Shopping Center Age, Feb. 1, 1995, 3 pages.

Bogle, Mutual Funds at the Millennium: Fund Directors and Fund Myths, The Vanguard Group to the '40 Act Institute of PLI (Practicing Law Institute), New York, NY, May 15, 2000, 15 pages.

New 1-800-CALL-ATT Campaign Promotes One Number for All Calls, AT&T Marketing, News Release, www.att.com/press/0297/970217.csa.htm, Feb. 17, 1997, 2 pages.

Schwab, Charles, Now 7 Ways For A better Total Return For Your Money; Schwat 1, The Inventor's Asset Management Account, Charles R. Schwab, Charles Schwab & Co., Inc., 16 pages.

Allen et al., Overview of Smart Cards and the Industry, Smart Cards: Seizing Strategic Business Opportunities, Chapter 1, p. 2-20, Irwin Professional Publishing, 1997.

Paper or Plastic? With these three incentives, The Choice is Yours, Incentive, Feb. 1996, 2 pages Dugas, Payroll May Ask: Paper or Plastic?, USA Today, 3B, Aug. 14, 2001, 1 page.

Proton world and Europay to co-operate in creation of new CEPS-compliant e-purse application, Press Release 1999, Waterloo, Belgium, Jun. 28, 1999, 2 pages.

Brown et al., Purchasing Card Magic: Eli Lilly Finds Accounts Payable Flying High With Plastic, Corporate Cashflow, vol. 15, No. 12, Nov. 1994, 2 pages.

Purse Application for Cross Border Use in Euro, Cordis, Pace 1st 1999-11531 Pace, www.cordis.lu, printed Feb. 23, 2001, 3 pages.

SK100 Smart Card Electronic Purse Balance Reader, SK100 Balance Reader, http://perso.wanadoo.fr, printed Feb. 23, 2001, 1 page.

Miller, Section E.2.1: Kerberos Authentication and Authorization System, Project Athena, Cambridge, MA, Dec. 21, 1987, 39 pages.

Souccar, Smart Cards: 1st Union Smart Card Pilot Enlists a Second Army Base, American Banker, Digital Frontiers, vol. 164, Mar. 31, 1999, 3 pages.

Smart Cards: Big Brother's Little Helpers, The Privacy Committee of New South Wales, No. 66, Aug. 1995.

Smart card for loyalty and e-purse applications eclipses capability of conventional mag-stripe cards, Press Release. www.1.sib.com, Apr. 21, 1997, printed Feb. 23, 2001, 3 pages.

SmartAxis: Load Cash on to your E-Purse Card, Supported Currencies and Schemes, www.smartaxis.co.uk, printed Feb. 23, 2001, 9 pages.

Spurgin, Sopininmon! or What's Happening in the Retail Credit Card Environment, Credit World Journal, vol. 85, No. 4, Mar. 1, 1997, pp. 20-23.

Lacker, Stored Value Cards: Costly Private Substitutions for Government Currency, Economic Quarterly, 1996, Economic Quarterly, v82, n3, p. 1(25), ISSN: 1069-7225, 17 pages.

Lazarony, Stuck for a gift? Give a prepaid credit card, www.bankrate.com, Dec. 21, 1998, 1 page.

Key, Swift Gift 'Wows' Internet Shoppers, PR Newswire, www.key.com/swiftgift/home.html, Dec. 2, 1998, 1 page.

The Campus Card Conundrum, Card Technology, Journal ISSN: 1093-1279, p. 25+, Feb. 1998, pp. 1-8.

The Electronic Purse Reaches the Car Park, http:\\docs.vircom.net/mobility/parking, printed Feb. 23, 2001, 2 pages.

The Evolution of a New Consumerism, Chain Store Age, vol. 73, Jun. 1997, pp 8-9.

The Federal Transit Administration, TCRP Report 32 Multipurpose Transit Payment Media, Chapter 2 Multipurpose Fare Payment: Overview, p. 10-20.

Stoughton, The Gift of Credit, www.washingtonpost.com/wp-srv/business, Dec. 14, 1998.

Nora Wood, The Power of the Card, Incentive, Jul. 1997, 6 pages.

Stuber, The electronic purse: An overview of recent development and issues, Bank of Canada, Technical Report No. 74, www.bankofcanada.ca, Jan. 1996, printed Feb. 23, 2001, 2 pages.

Understanding the benefits: Smartcity offers a number of important benefits to both the card issuers and their customers, http://www.icl.com/smartcards/benefits.htm, printed Feb. 27, 2001, 2 pages.

Langheinrich et al., Unintrusive Customization Techniques for Web Advertising, Computer Networks, vol. 31, 1999, pp. 1259-1272.

Universal Card free lifetime membership extended 3 months, AT&T Marketing, www.att.com/press/0297/970217.csa.html, Dec. 4, 1990, 2 pages.

Visa Cash - Where can I get it?, www.visa-asia.com/pd/cash/where.html, Feb. 23, 2001.

Visa Cash, www.visa-asia.com/pd/cash/main.html, Feb. 23, 2001.

Visa International And SERMEPA Announce Plans For Cross Border Visa Cash Based on CEPS, www.visa.com/av/news/praaamisc111699.vhtml, Nov. 16, 1999.

Visa first to launch electronic purse load via GSM mobile phone, www.cellular.co.za, Johannesburg, ZA, printed Feb. 23, 2001, 4 pages.

Visa releases visa cash electronic purse specifications based on CEPS, www.visa.com/av/news/PRaamisc042099.vhtml, San Francisco, Apr. 20, 1999.

Hansell, Visa to unveil electronic purse cards, New York Times, printed Feb. 23, 2001, 2 pages.

Welcome To Card Express CardEx, CardEx website archived by web.archive on Oct. 31, 1996, http://web.archive.org/web/*/http://www.cardex.com, retrieve Oct. 18, 2003, 7 pages.

Welcome To Card Express, The CardEx Incentive Card, as disclosed in the CardEx web site archived by web.archive.org on Feb. 7, 1998, http://web.archive.org/web/*/http://www.cardex.com, retrieve Oct. 18, 2003, 8 pages.

SWIFTGIFT, Welcome to Swiftgift, www.swiftgiftcard.com, Dec. 8, 1998, 10 pages.

Kenneth Hein, What's the Deal?, Incentive, Jul. 1998, 7 pages.

Machlis et al., Will smart cards replace ATMS?, Computerworld, printed Feb. 23, 2001, 3 pages.

Definition of Store-Value Card, Wikipedia, retrieved from the internet at http://en.wikipedia.org/wiki/Stored-value_card, retrieved from the internet on Apr. 16, 2007.

PCT, International Search Report, PCT/US2004/006108, Feb. 27, 2004.

Higuera et al, "Software Risk Management", Software Engineering Institute, Jun. 1996, 58 pages.

STRATEGIES & TACTICS, "Consulting Services", www.strategies-tactics.com, Jan. 24, 1997, [retrieved on Feb. 15, 2008], 10 pages, Retrieved from www.archive.org.

Lerouge, Cynthia, "Managing by Projects", Strategic Finance, Nov. 1999, vol. 81 Issue 5, [retrieved on Feb. 15, 2008], 23 pages, Retrieved from: web.ebscohost.com.

"How to live up to deadlines", Industrial Computing, May 1989, [retrieved on Feb. 15, 2008], 5 pages, Retrieved from : Dialog.

Haimes, Yacov Y., "Risk Modeling, Assessment and Management", John Wiley & Sons Inc. 1998, 36 pages.

"Compliance: An exercise in Risk Management", ComplianceAction, Apr. 1996 [retrieved on Feb. 15, 2008], vol. 1, No. 7, 2 pages, retrieved from: bankersonline.com.

Antl, Boris et al.; "As easy as ASP", Euromoney-n382, pp. 160-166, Feb. 2001, [retrieved on Feb. 15, 2008] 21 pages, Retrieved from ebscohost.com.

Royer, Paul S., "Risk Management: the undiscovered dimensions of project management", Project Management Journal-v31n1, pp. 6-13, Mar. 2000.

* cited by examiner

TITLE OF RISK ACKNOWLEDGEMENT

| TYPE: | ☐ NEW  ☐ PERMANENT  ☐ RENEWAL  ☐ REVIEW —90 |
|---|---|
| INITIATOR: | |
| INFORMATION OWNER: | |
| RISK MANAGER: | |
| BUSINESS OPERATION: | 91 |
| DEPARTMENT: | |
| APPROVAL DATE: | |
| EXPIRATION / REVIEW DATE: | |
| CLASSIFICATION: | ☐ HIGHLY SENSITIVE  ☐ SENSITIVE  ☐ INTERNAL  ☐ PUBLIC —92<br>☐ NOT APPLICABLE |
| POTENTIAL IMPACT: | ☐ CATASTROPHIC  ☐ SEVERE  ☐ MODERATE  ☐ LOW —93 |
| PROBABILITY OF OCCURENCE: | ☐ HIGH  ☐ MEDIUM  ☐ LOW —94 |
| REASONS FOR RISK ACK: —95 | |
| COMPENSATING CONTROLS: —96 | |
| POTENTIAL IMPACT DESCRIPTION: —97 | |
| IMPLEMENTATION PLAN: —98 | |

|   | DISCLOSED | MODIFIED | REPUDIATED |
|---|---|---|---|
| 1. What would be the Competitive Advantage if the information was: |   |   |   |
| 2. What would be the Legal, Fiduciary or Regulatory impact to your business if the information was: |   |   |   |
| 3. What Financial Loss would your business incur if the information was: |   |   |   |
| 4. What would be the Operational Disruption / Denial of Service impact to your business if the information was: |   |   |   |
| 5. What would be the impact on the Perception of your enterprise by Customers, Business Parteners, or Employees if the information was: |   |   |   |

Risk Rating Choises:    Catastrophic;  Severe;  Moderate;  Negligible

Fig. 6

Compliant ⊘  In Progress △  Not Compliant, Compensating Controls ◇  Not Compliant ▽

Not Assigned ⊕  Not Applicable ☐  Yes [Y]  No [N]

Home | Feedback | Contact Us | Sign off

| Applications | Reporting | State of Health | Technology Risk | | | |
|---|---|---|---|---|---|---|
| Business Executive | Line of Business | Reg. | Risk Mngmt | Corrective Action Plan | Risk Ack |
| Richard | Card Services | ▽ | ▽ | Y | Y |
| Thomas | Home Finance | △ | △ | Y | N |
| Mark | Development | ⊘ | △ | Y | Y |
| Maureen | Philanthropy | ⊕ | ◇ | Y | Y |
| Jill | Actuarial | ⊕ | △ | Y | N |
| William | Customer Service | ⊘ | △ | N | N |
| Charles | Human Resources | ⊕ | ⊕ | N | N |
| Ellen | Information Technology | ⊕ | △ | N | N |
| Christine | Regional Banking Group | ▽ | ◇ | Y | Y |
| 142 | 143 | 144 | 145 | 146 | 147 |

I/TC Policies Questionnaire:

- Documentation:
- Security Administrator (SA) Name
- Vendor Aspects

IT Policies

- ☒ Policy 1 - Logical Access Control
- ☒ Policy 2 - Network Security
- ☒ Policy 3 - Physical/Environmental Controls
- ☒ Policy 4 - Micro Computing Usage Controls
- ☒ Policy 5 - Wholesale Financial Messages
- ☒ Policy 6 - Contingency Planning
- ☒ Policy 7 - Vital Record Management
- ☒ Policy 8 - Technology Outside Service Provide
- ☒ Policy 9 - Intrusion Investigating and Reporting
- ☒ Policy 10 - Electronic Mail Usage
- ☒ Policy 11 - Public Internet/Intranet usage
- ☒ Policy 12 - Change Management Control
- ☒ Policy 13 - Encryption of CMC Information
- ☒ Policy 14 - Mobile and Remote Computing
- ☒ Policy 15 - Information Technology Consultant usage
- ☒ Policy 16 - Microcomputing Hardware & Software Asset Management

Fig. 10

SYSTEM AND METHOD FOR MANAGING GLOBAL RISK

RELATED APPLICATIONS

This application is based upon and claims benefit of U.S. Provisional Application 60/254,847, filed on Dec. 12, 2000, to which a claim of priority is hereby made.

BACKGROUND OF THE INVENTION

1. Field of the Invention

The present invention relates to a system and method for managing global risk, and more particularly relates to a globally accessible system for evaluating variables related to risk associated with a given project or enterprise.

2. Related Prior Art

In any given enterprise it is often desirable to evaluate the risk associated with particular activities. Risk can be determined in a number of different ways, for instance based on possible positive and negative outcomes, and can be assigned various levels of importance for a given project.

For example, an enterprise may wish to evaluate its exposure with regard to regulatory compliance. Various individuals within the enterprise having responsibility related to regulatory compliance generally prefer to have a working knowledge of the procedures in place to produce compliance, and the status of various efforts to ensure compliance with regulatory requirements. Whenever a new task is undertaken in a given area related to regulatory compliance, the person or persons initiating the project for completing the task may be required to assess the risk involved with implementing a solution. The persons knowledgeable about the task and goals may be required to answer questions on a questionnaire or otherwise fill out a form to evaluate the risk associated with the particular task with respect to associated regulatory requirements and for reporting purposes. The task may be evaluated for risk associated with liability to the enterprise if a customer makes a claim related to regulatory sections with which the enterprise has not complied, for example. The individuals may be asked to rate various levels of risk from low to high, and provide other indicia related to ranking of risk factors.

Another aspect of risk management relates to procedures established by the enterprise, with accompanying directives by management to comply with the procedures. A given manager responsible for a particular department may wish to establish the level of risk associated with activities in the department, and may formulate some system for evaluating and reporting risks, that can be used by lower level managers, and project managers, for instance. For example, on a periodic basis, such as quarterly, the managers for a given department might be required to communicate to upper management the various risk factors and risk evaluations that are related to computer information systems operations. Such risk factors can include security, backup procedures and data retaining procedures, for example. The risk factor related information can be provided through various forms or questionnaires for evaluating risk and risk factors associated with projects for which they are responsible. These forms and questionnaires can be compiled into reports and other summary data to provide a department manager with a fairly good idea of the level of compliance with various enterprise procedures.

Typically, if a group within the department is not in compliance with the established procedures for the enterprise, this information can be so noted in the summary or compiled data presented to the department manager. In such a case, the department manager can establish plans to bring the group into compliance, and monitor the status of the group in progressing with the plan.

The impact of evaluating the risk for a given enterprise can have serious consequences with regard to the success, or profitability of the enterprise. For example, if an enterprise is found not to be in compliance with regulatory requirements, the enterprise may be susceptible to penalties such as large fines, lawsuits, or potentially intense scrutiny by regulatory agencies. In addition, if the enterprise has established procedures that are designed to protect the enterprise from liability, or otherwise assure that levels of risk within the enterprise are minimized, the enterprise can be exposed to tremendous liability if the procedures are not properly followed. Also, the enterprise may suffer further liability if it is unable to ascertain, or provide proof of compliance with established procedures, in the context of a lawsuit, for example. Moreover, the enterprise may suffer the loss of a competitive advantage if sensitive data is compromised, for example.

Accordingly, large enterprises that may be vulnerable to a number of different types of risk typically attempt to ascertain the level of exposure to given risks at various levels within the enterprise, and minimize the exposure to risk that the enterprise may potentially suffer. In addition, the enterprise may establish a reporting system in which the degree of compliance with established procedures or regulatory requirements is readily accessible. Finally, the enterprise may wish to establish a plan to bring various groups or departments into compliance with procedures or regulatory requirements, and track the progress of the plan as the group or department moves towards compliance.

In typical enterprises, these types of reports and statuses regarding compliance with procedures or regulatory requirements to avoid risk are often somewhat haphazard, and inconsistent. For example, some managers may find the requirement of filling out forms and answering questionnaires to be an inefficient use of time, and fail to effectively complete risk assessments. Furthermore, in a department where the manager fails to take note of the potential problems caused by failing to evaluate the risk associated with the department's activities, it is often the case that other members of the department will similarly fail to complete assessments associated with risk of activities within the department.

It is also the case that the tools of these risk assessment type systems are form intensive, and inconsistent between various enterprise locations, for example. It is also often difficult to track and maintain the data that can be obtained from forms related to assessment of risk. For example, forms containing information related to risk assessment must be gathered, and the information must be compiled, in order to be useful as a risk assessment tool. The transfer of paper documents within a large scale enterprise is often a difficult task, and can lead to issues involving document storage space.

Solutions to overcome the difficulties associated with paper based reporting systems for use with risk assessment often include the application of computer systems that are designed to permit a number of individuals responsible for risk assessment to enter data online. Once the data related to risk assessment is in electronic format, tasks such as data compilation, reporting and assessment can be accomplished with greatly reduced overhead and savings with regard to use of valuable resources. However, systems in which individuals enter information online related to risk assessment suffer from some of the same drawbacks as the paper based systems. For example, separate departments and locations within a given enterprise may develop their own online tools for inputting information related to risk assessment. Accordingly, it is difficult to consolidate information across departments or enterprise locations. This drawback in obtaining consistency across departments is highly noticeable when various groups, departments or locations within an enterprise continue to use a paper based risk assessment system, while other groups, departments or locations use a variety of online type systems. Consolidating information related to risk assessment in such an environment can require a tremendous amount of resources, and yet still achieve inconsistent results.

Additionally, if a group or department is not in compliance with a given protocol, devising a plan to bring the entity into compliance with a particular protocol can be problematic. Managing the progress status of any plan to achieve compliance can be troublesome and fraught with some of the same difficulties as accumulating risk assessment information in the first place. For example, the progress of the plan may be reported inconsistently, or suffer from the perception of being a low priority task. It is also difficult for department managers to obtain feedback regarding compliance with protocols, for example, in a timely manner. For example, if a given department must be in regulatory compliance within a specific date, it may be very difficult for the department manager to evaluate whether the department is on schedule for meeting the regulatory requirements.

Accordingly, a system for assessing risk on a widespread and consistent basis, that can also provide reporting, planning for compliance, assignment of responsibility and accountability and tracking of compliance plans is highly desirable. Such a system, and method for accomplishing the system, is provided by the system and method according to the present invention.

SUMMARY OF THE INVENTION

It is an object of the present invention to overcome the drawbacks associated with the prior art.

Briefly stated, according to the present invention there is provided a system and method for determining compliance with enterprise policies and regulatory requirements as an auditing feature based on questionnaire responses that tracks steps to move towards compliance. One or more responsible parties for a given project are identified or appointed to be responsible for responding to compliance questionnaires. The parties fill in questionnaires designed to focus on various features of risk assessment for specific aspects of a given project. For example, the responsible parties for a project that includes features that require data storage and computer information system access would be asked to rate their disaster recovery readiness. The rating for disaster recovery readiness may depend upon such factors as whether information is stored off site on a regular basis, intervals in which system backups are made, robustness of computer recovery systems and so forth.

Once a questionnaire has been completed, the project can be given an overall rating of exposure to various forms of risk. Areas of risk can be acknowledged, prompting a sensitivity rating, such as severe, negligible and so forth. Once risk is acknowledged, a plan for reducing the risk or bringing the project into compliance can be formulated, and progress towards compliance can be tracked. Alternatively, an identified exposure to risk can be disclaimed through the system, which requires sign off by various higher level managers and administrators.

Once risk assessment is completed for various projects, a higher level manager can review exposure to risk on a broad perspective, and through a user interface, expand particular areas where high risk is identified as a problem. A risk category that is expanded reveals the different departments and/or projects and their associated risks or compliance statuses. The higher level manager can thus identify particular projects or activity areas where risk exposure exists.

The sensitivity of the risk factors can also be gauged and used to develop an overall risk rating. For example, a person responsible for assessing the risk related to a particular project is asked to rate the sensitivity of various hypothetical events such as competitive disclosure, financial loss or impact on perception of customers.

Requirements for compliance with regulatory demands and regulatory agencies are built into the risk management tool. Project managers and higher level managers can determine in a glance if a particular project is in compliance with regulatory guidelines. Higher level managers have broader access than lower level mangers to risk assessment information according to level of seniority. For example, a middle level manager can see all the risk assessment factors for each department/project that they manage, but can see no risk information beyond their allotted level. A high level manager can view all the information available to the mid level manager, in addition to any other manager or group for which the high level manager has responsibility. Accordingly, access to the system is provided on a secure basis that is reflective of the user's level of seniority.

The system also provides security features such as logon IDs and passwords. Access levels are assigned based on seniority or management status, and provide a mechanism for a secure review of risk exposure and compliance. Once data is entered into the system it cannot be modified unless the user has proper authorization. The system generates reports to inform persons or groups about their compliance status. A search tool is available for locating various businesses, compliance areas, risk status levels and so forth. The system can also be used for training users on risk management policies, how risks are evaluated and how paths to compliance can be determined.

The system according to the present invention thus provides immediate compliance verification, a calendar of events, allows shared best practices and corrective action plans and provides a mechanism for risk acknowledgement communicated to other members of a hierarchy. The system can be used in any hierarchical organization including such risk sensitive enterprises as military units, space missions and highly financed business endeavors.

BRIEF DESCRIPTION OF THE DRAWINGS

FIG. 5 is an illustration of form for risk acknowledgement;

FIG. 6 is a chart illustrating an example of sensitivity ratings according to particular events related to a business;

FIG. 8 is a depiction of a risk management summary display for a business group;

FIG. 9 is a chart illustrating various parameters related to risk management organized by business operation;

FIG. 10 is a chart illustrating risk management status for a subdivision of a business operation;

Other features and advantages of the present invention will become apparent from the following description of the invention that refers to the accompanying drawings.

DETAILED DESCRIPTION OF THE PREFERRED EMBODIMENTS

Figure 1:
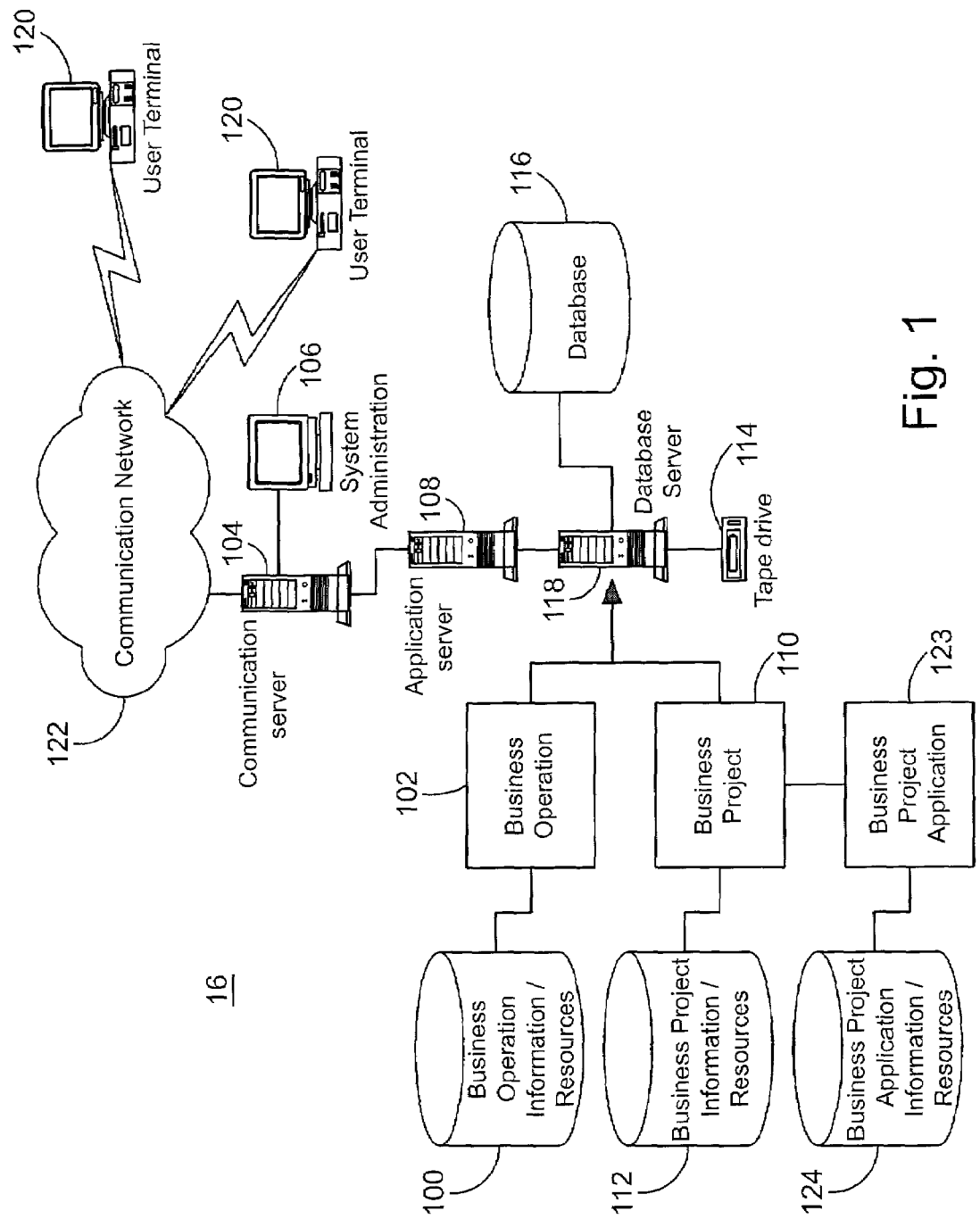
FIG. 1 is a diagram showing various system components and interconnectivity according to the present invention.

Referring now to FIG. 1, a diagram of system components and their interconnection is shown generally as system 16. A number of users 120 are able to access system 16 through a communication network 122. Users 120 connect to a communication server 104, for which connection access is granted by a system administrator 106. An application server 108 is connected to communication server 104 and provides users 120 with formatted application information that is transmitted to users 120 through communication server 104. Application server 108 is also connected to a database server 118 that operates to access and collect data related to the application. Database server 118 is connected to, and can access, a database 116 to retrieve, store and modify application related information. Database server 118 is also connected to a tape drive 114 to permit application information to be backed up and stored for safekeeping.

Database server 118 is aware of a number of business operations or projects for which a risk management assessment can be made. Business operation 102 is shown coupled to database server 118 as an example of a business operation or project that falls under the scope of risk management system 16. Business operation 102 has associated with it business operation information resources 100, which provide data for business operation and projects within business operation 102. In a given business operation, a number of projects may be active at any given time, as illustrated by a project 110. Project 110 has associated with it project information resources 112, that provide project related data and data management. Project 110 can also have a number of applications that support the project operations, as illustrated by a project application 123. Applicant information resources 124 are accessible by application 123 as a data resource for management of application information. The system of the present invention uses application 123 as the basis for tracking system information. For example, each application is defined under a business project, which is in turn defined under a business operation. Accordingly, changes to application 123 are tracked throughout the system, and are recorded in, for example, a log file. The system provides a search function to locate various applications, and includes functions to delete applications or change information related to application 123.

Risk management system 16 assesses risk related to each application 123, and provides summary risk information for components such as application 123, project 110, and business operation 102, for example. Application server 108 provides users 120 with status of the various risks associated with business operation 102, project 110 and applications 123. The information provided to users 120 about risk associated with various applications is accessed through database server 118. Application server 108 also provides an interface for access to risk management system 16 through a display viewable by users 120 once they access the system through communication server 104.

Figure 2A:
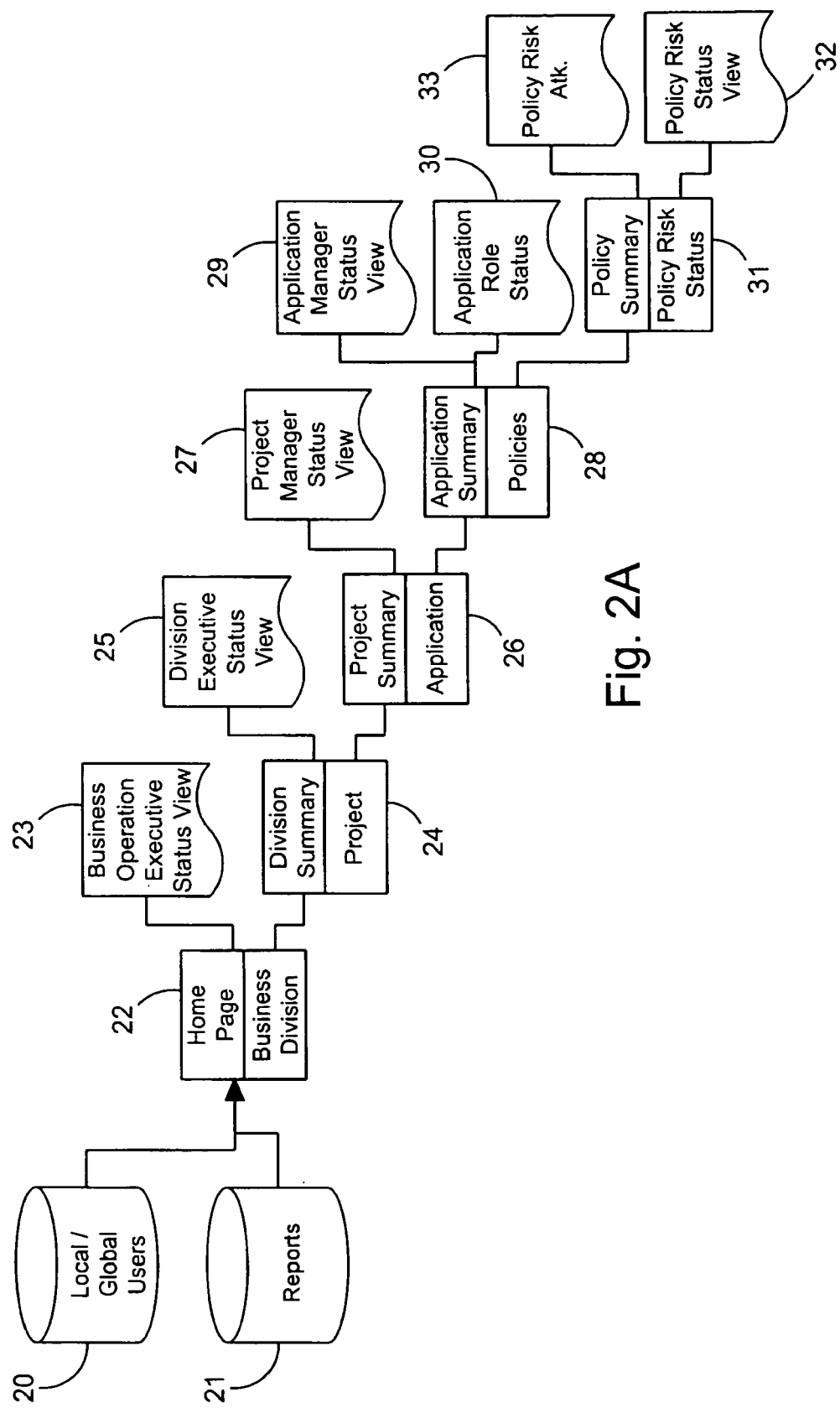
FIGS. 2A and 2B show navigation paths for reviewing risk related data according to the present invention.

Referring now to FIG. 2A, an illustration of views and navigation paths available to users 120 is shown. Users are registered with risk management system 16 through user registration database 20. Registration database 20 can accommodate local and global users to permit access to a login home page 22. Login home page 22 serves as a point of entry and overall frame of reference for risk management system 16. Through home page 22, users 120 can view a risk status summary for an entire business line through a business operations status display 23, presuming user 120 has been granted authorized executive level access to the system. Business operations status display 23 provides indications of levels of risk associated with various activities on a summary level for given business operations. The statuses of risks for various applications and projects are escalated, consolidated and summarized for display in status display 23. The process by which risk statuses associated with projects and applications becomes escalated, or promoted, is discussed more fully below.

If user 120 wishes to obtain details about risk indications shown in status display 23, they can make a selection to navigate to business operation subdivision status 24, for example by choosing a business operation link. Subdivision status 24 is also accessible directly from home page 22 by users with lower seniority than the user authorized for status display 23. Subdivision status 24 provides risk assessment information summarized by subdivision level for a business operation. For example, a business operation may be broken into a number of departments, each of which may have a variety of projects and applications for which a cumulative risk assessment may be made. The cumulative risk assessments are displayed in subdivision status 24. A manager responsible for a given operational subdivision can view subdivision risk status information through authorized managerial access in a subdivision status display 25. Subdivision status display 25 is also viewable by executive users with access to status display 23. Accordingly, each executive or manager has access to all risk status information associated with their management level, as well as all lower business subdivisions for which they have responsibility.

If a user selects a particular subdivision of the operation from subdivision status 24, a display of all projects that are active in the selected subdivision is provided in a project status 26. As with the upper business divisions, a project manager is given appropriate authorization to view project risk status in a project status display 27. Users with access to status displays 23 and 25 also have access to project status display 27. If the user selects a particular project displayed within project status 26, a number of applications associated with the selected project are displayed in an application status 28. Users responsible for particular applications can view an application status display 29 associated with applications for which they have been granted authorization. Individuals that have been assigned roles with respect to particular applications are displayed in an application role display 30. The roles involved with a particular application include an information owner, a project manager and so forth. An information owner has the responsibilities of being aware of applicable control policies, assessment of application security and implementation of maintenance, availability and integrity processes, for example. They are knowledgeable about application confidentiality issues, other assigned role members, and can grant authority for application access. Application status 28 also provides information related to particular applications such as the application platform and location.

Each application has associated with it a number of policies for handling technology and information as provided on an enterprise basis. An example of an information policy provides the requirements for disaster recovery preparedness, including business continuity. The policy may require a plan accessible to a crisis team for recovery, for instance, with the plan being placed in a repository and periodically updated and tested. The level of compliance with the policies associated with a given application provides the associated level of risk for the application. For example, if a policy provides for the privacy of information for certain sensitive applications, a small degree of compliance with the policy may create a large amount of risk. As policies are created, updated or deleted, affected applications must be reevaluated for risk assessments pertinent to the policy changes.

The policies involved with an application selected from application status 28 are shown in a policy status 31. Policy status 31 provides a summary view of the policies associated with the selected application, and the present status of the policies with regard to risk assessment is shown in a policy status display 32. For each policy, a given application can be in compliance or not in compliance, as discussed in more detail below. If a given application is not in compliance with a policy, an indication is provided in policy status display 32. The users responsible for assessing risk of non-compliant applications, as designated in application role display 30, are required to provide a risk acknowledgement for the policy, as indicated in a policy risk acknowledgement 33. The responsible user is asked in policy risk acknowledgement 33 to provide a path for obtaining compliance, or to obtain approval and acknowledgement of the issues associated with continuing non-compliance. A discussion of the factors involved in completing risk acknowledgement for a given policy is provided in greater detail below.

Figure 2B:
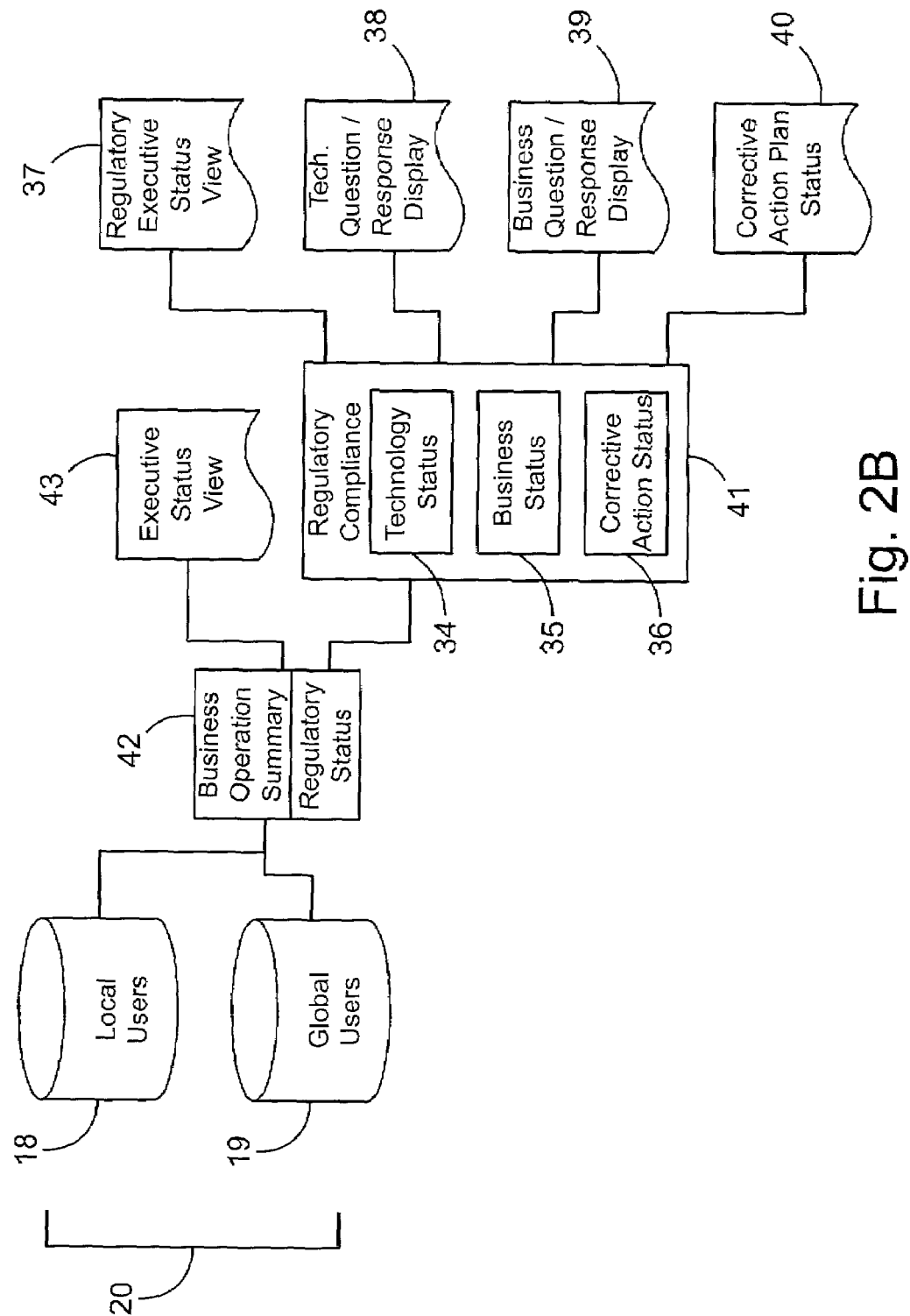

Referring now to FIG. 2B, a diagram of risk assessment related to regulatory requirements is shown. As with the general business risks associated with the diagram in FIG. 2A, users of the risk management system are first registered to be able to access the system. Users can be located locally, or on a remote, global basis as indicated by user registrations 18, 19. Once a user logs into the system, a list of various business operations is displayed, as indicated in business operation status 42. Business operation status 42 shows a list of business operations, and provides a business operation status display 43. Business operation status display 43 shows a summarized set of risk assessment factors associated with regulatory compliance status. Depending on the user's access permissions, a login to the system can place the user at a level equivalent to that of home page 22 or project status 26, for example. In any case, it should be apparent that business operation status 42 can be merged with any of the entry screens according to access permission levels, so that both regulatory and business related risk statuses can be displayed on one screen.

Among the risk factors that are displayed is an indication of compliance with federal regulations or requirements. The user can select a regulatory risk status associated with a given business operation from business operation status 42. Once the user selects a regulatory status related to a particular business operation, a regulator compliance display 41 is provided for viewing. Each subdivision in regulatory compliance display 41 has several risk assessment components, for which summary indications of levels of risk are displayed. Each subdivision has a technology compliance status 34, a business compliance status 35 and a corrective action status 36. Each status 34-36 indicates levels of compliance with risk management policies, in addition to the corrective action status for a given subdivision. The status indicators can be selected for further detailed examination of the status and its derivation. For example, selecting technology compliance status 34 produces a technology question/response display 38.

If a given business operation is in compliance with federal regulations, the regulatory indicator displayed in business operation status 42 reflects a positive status as a compilation of responses to risk questionnaires. The risk questionnaires can be viewed as shown by technology question/response display 38, a business question/response display 39 and corrective action plan status 40. Displays 38, 39 show questions related to assessing risk for given activities within a particular subdivision and business operation that affect the state of compliance with federal regulatory requirements. The responses to the questions posed in displays 38, 39 are yes/no type questions, for example, with attendant comments discussing the response. For example, a positive risk assessment can be obtained even if a risk assessment question is answered in the negative, and the comment section describes procedures put in place to obtain compliance. When the risk management assessor reviews the questionnaire, she can assign a status of compliant, non-compliant or "warning" for the particular subdivision. Accordingly, a technology or business display 38, 39 having negative responses for compliance, together with compliance plans deemed inappropriate by a reviewer, results in a non-compliant indication for a subdivision.

Selecting corrective action status 36 produces corrective action plan status 40, which outlines a path for obtaining compliance with regulatory requirements. If a risk management review results in the decision that the corrective action plan is inadequate, the compliance indicator for the particular subdivision will indicate non-compliance. If the corrective action plan is acceptable after risk management review, the compliance status for the subdivision indicates compliance with regulatory requirements.

It should be apparent that while various breakouts of organization structures are shown and described according to the present invention, many types of organizational structures are possible. The present invention works equally well, for example, if an organization is arranged as a partnership or limited liability corporation. In addition, an organization structure that is "flat," or with only very few levels of managerial structures can benefit from the present invention. It should also be apparent that while the regulatory requirements discussed above are based on federal regulations, any type of regulatory or other agency requirements can be used as compliance goals.

Technology and business questionnaires that make up and result from displays 38, 39 are also time/date stamped with the author of the questionnaire responses noted. Information related to the author of the response is also available, such as the business division and operation to which they belong, and contact information. For each of the business operations, the executive or manager in charge of the business operation is able to display regulatory compliance status for the business operation on a summary level, as indicated with a business operation status display 43. Status display 43 is limited to access by the particular executive or manager responsible for the business operation for which the risk status is provided. The executive or manager for the business operation is authorized to view status display 43 by virtue of providing the appropriate logon information when accessing the system initially.

Similarly, a subdivision executive or manager can view only the regulatory compliance risk status for their particular subdivision through a regulatory status display 37. Regulatory status display 37 provides a compilation of risk compliant statuses for the various projects and applications associated with the subdivision for which the manager or executive has responsibility. Similarly, business operation status display 43 provides a compilation of risk compliant status for a business operation that includes all subdivisions within the business operation. Accordingly, an executive or manager with authorization to access status display 43 also has access to risk status view 37, associated with particular subdivisions under the business operation.

Figure 3:
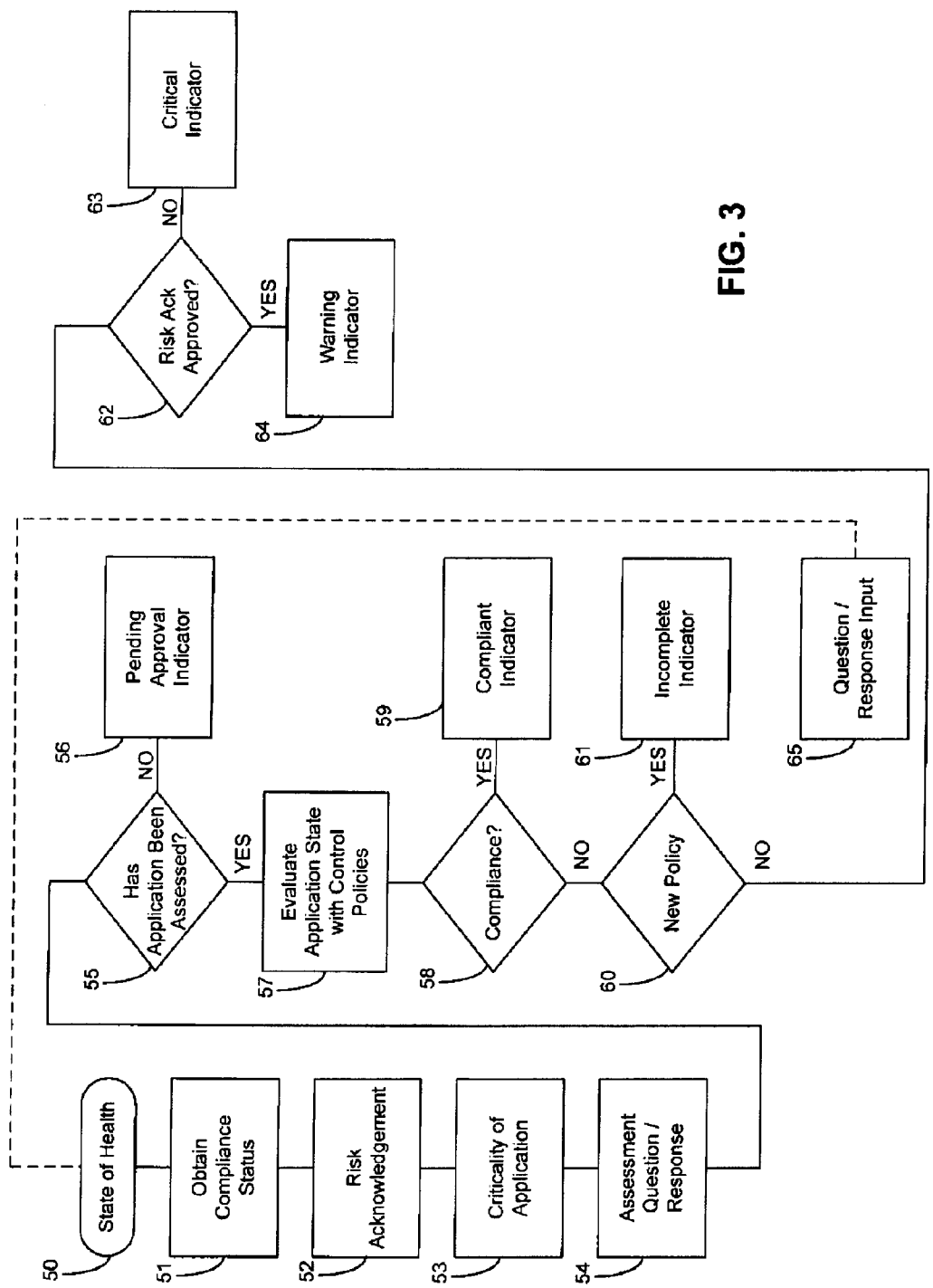
FIG. 3 is a flow diagram illustrating the rating procedure for various risks.

Referring now to FIG. 3, a flow diagram for determining the status of risk indicators for providing a state of health for a business operation, subdivision, project and so forth is shown. The process of determining a state of health is identified in step 50 and begins in step 51 with obtaining and identifying compliance related information for a given application. While the invention is illustrated in FIG. 3 as being oriented toward applications, it should be apparent that the other types of risk related activities are contemplated. For example, the activities associated with a business operation, subdivision or project are also contemplated. In addition, activities related to various aspects of business are considered to be available for application of the present invention. For example, marketing, sales, research and engineering activities are all considered to be within the purview of risk assessment according to the present invention.

Pertinent applicable business and technology control policies are obtained and applied comparatively to determine whether the criteria for the control policies is met by the state of the compliance information associated with the application in step 52. Any risk acknowledgement information, including approved responses and status of compliance plans, is also obtained in step 52. The critical business aspects and sensitivity related to various portions of the application are obtained and applied in step 53. Criticality ratings for the various risk related aspects of the application are discussed in more detail below. The sensitivity of an application is also discussed in determining how much risk to assign various applications, and when non-compliance is escalated to a higher managerial level.

In step 54, a self-assessment questionnaire response is obtained, consisting of a series of questions that must be answered with appropriate responses to produce compliance. It should be apparent that the assessment can be conducted interactively online, for example, but is not to be considered so limited. For example, the assessment can be accomplished through the use of paper forms, or a combination of paper and electronic media. After the assessment, the process then proceeds to a decision step 55 in which a determination is made as to whether the application in question has been assessed for risk compliance. If an assessment has not been completed, the process branches from decision step 55 to a pending approval indicator 56. Pending approval indicator 56 indicates that further entry is required for one or more inputs, or that the application has not passed completely through the assessment and approval process. If an assessment has been made, decision step 55 branches to a comparison step 57, in which the status of compliance is determined based on applicable control policies and self-assessment of application sensitivity and criticality.

In decision step 58 a determination is made on whether the application is in compliance, either by meeting all the requirements of the applicable control policies in the various risk assessments, or by having an approved process or plan in place to achieve compliance. If the application is compliant, decision step 58 branches to compliant indicator step 59. Compliant indicator step 59 provides a visual indication that is displayed to the user to show that the particular application is in compliance with the guidelines established by the control policies.

If the application is not in compliance as determined in decision step 58, the process branches to decision step 60, where a determination is made on whether the institution of a new policy has prevented a particular application from being in compliance. If a new policy, or an amendment to an existing policy, has prevented compliance, the process branches to incomplete step 61, in which a visual indicator identifying the risk assessment as incomplete is displayed to the user. The process continues after incomplete step 61 to input step 65, in which the user can be prompted for additional input, or completion of policy questions that remain unanswered. Once the input or answers to policy questions are obtained, the process for determining the state of health with regard to risk assessment can be initiated from the beginning to obtain a further compliance indication result.

If a new policy or amendment to a current policy has not been made, as determined in decision step 60, the process continues with decision step 62, which determines whether a risk acknowledgement has been approved. Risk acknowledgement approval is needed when the strictures of a control policy have not been met and the risk is either deemed to be acceptable because of various issues of practicality, or a plan to achieve compliance has been formulated or is in progress. A risk management assessor reviews areas of non-compliance and the associated risk acknowledgements to provide approval if appropriate. If a risk acknowledgement is not appropriate for approval, decision step 62 branches to indicator step 63 in which an indication of critical lack of compliance is annunciated. Indicator step 63 provides a visual display to the user to inform them that they are (1) not in compliance and (2) have a non-approved risk acknowledgement. If a risk acknowledgement has been made and approved by a risk management assessor, decision step 62 branches to a warning indicator step 64. Warning indicator step 64 provides the user with a visual display showing that a risk exists because of non-compliance with one or more control policies, but the risk is either deemed acceptable for one or more reasons, or an approved plan is in place to achieve compliance.

It should be apparent that while the user is presented with a visual indication of risk status as a result of the process shown in FIG. 3, the status need not be a visual indication, but rather can be any kind of indicia that informs the user about the level of risk for a given application. For example, risk indications can be in the form of audible warnings or in a printed format. While the preferred embodiments of the present invention provides status indicators of different color, namely, green for compliant, amber for warning, red for critical, blue for incomplete and gray for pending approval, the present invention should not be considered to be so limited in general. For example, an indication of risk status based on indicators of varying shape can be used to inform users of risk status on electronic devices that do not have color displays. Alternately, a color and shape indication can be used in combination to permit the present system to be used in a number of platforms in a flexible manner. Numerous other forms of indicators should be apparent to those skilled in the art, which are not mentioned here for the sake of brevity, but should nevertheless be considered to be within the scope of the present invention.

Figure 4:
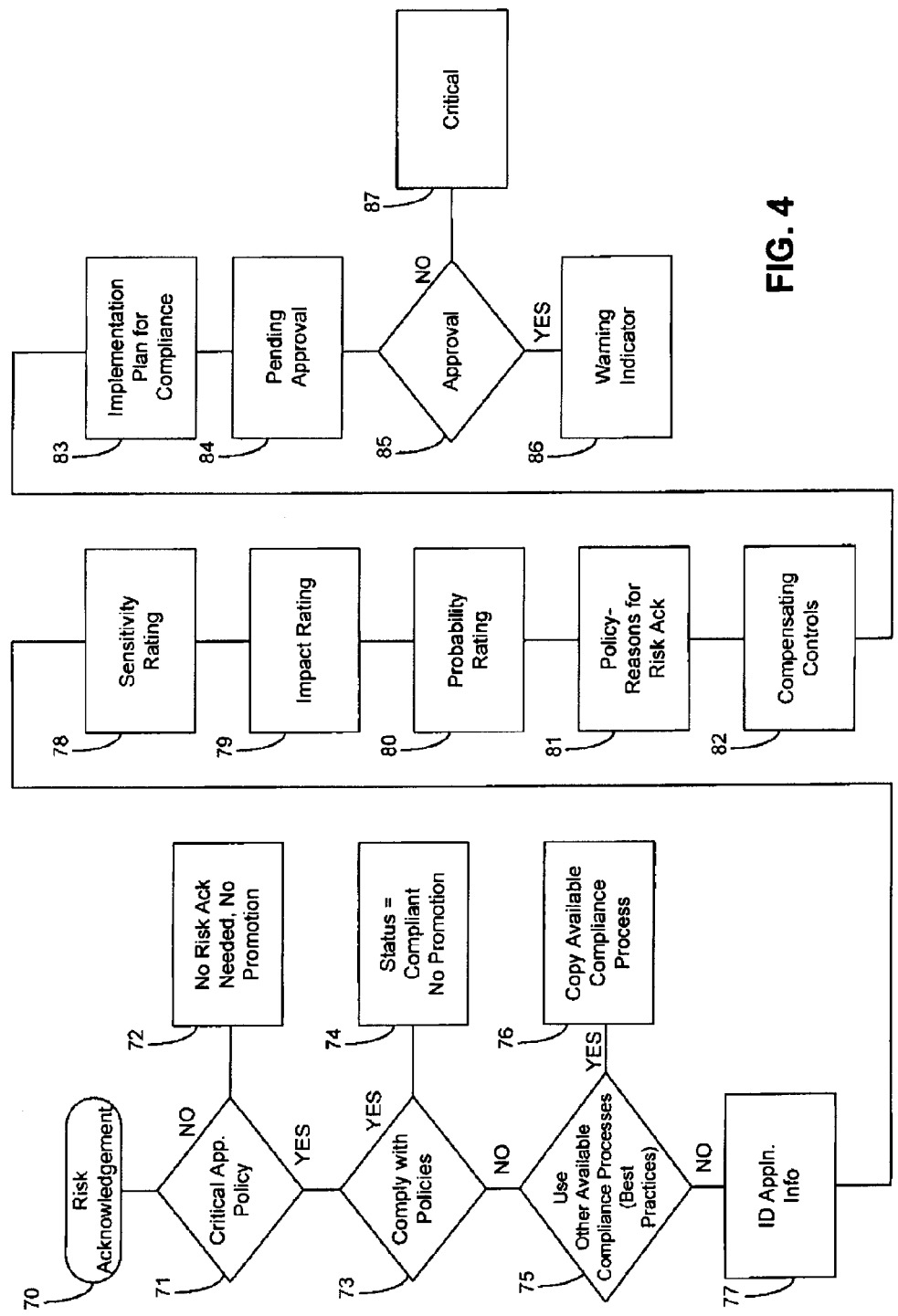
FIG. 4 is a flow diagram illustrating operation of risk acknowledgement procedures.

Referring now to FIG. 4, a flow diagram of a process for obtaining risk acknowledgement is shown. The risk acknowledgement process begins at process identifier 70 and continues to decision step 71, in which an assessment of the critical nature of the application is made. If the application is not deemed to be highly critical, decision step 71 branches to result step 72, which indicates that no risk acknowledgement is needed and no compliance issues are raised. If result step 72 is reached, the risk status is essentially a non-event that is not promoted to higher levels of management or included in risk status summaries or compilations.

If it is determined in decision step 71 that a particular control policy is applicable to the given application, decision step 71 branches to proceed to decision step 73, in which a determination of compliance with applicable control policies is made. As discussed above, compliance with control policies takes into account application activities and assessments, as well as application sensitivity. If the application complies with the various applicable control policies, decision step 73 branches to result step 74, in which an indication of control policy compliance is set. This risk status indication set in result step 74 may be promoted to higher levels of management if the application, project, subdivision, etc. is identified as highly critical or highly sensitive, as discussed more fully below.

If the result of decision step 73 is that various aspects of the application do not comply with control policies, decision step 73 branches to proceed to decision step 75. This path through the flow diagram shown in FIG. 4 is exercised if the person responsible for assessing compliance of an application provides a negative answer in response to control policy related questions. A negative response to a control policy question indicates that the given application or project, etc. is not in compliance with one or more applicable control policies. Once the user submits a negative response, they are prompted to view another application with a similar platform in which risk acknowledgement or compliance processes are already in place.

Accordingly, in decision step 75 the user is allowed to select whether another compliant process should be considered. If the user wants to consider another available compliance process, also referred to as a best practice, decision step 75 branches to result step 76, in which the user can obtain a copy of the available compliance process. The copy of the compliance process is used in a process for risk acknowledgement and providing a plan to achieve compliance with the appropriate control policy. If the user chooses to adopt the processes available in result step 76, the compliance process continues to decision step 73, in which the application is again checked for compliance.

If the user chooses not to use available compliance processes to achieve compliance, decision step 75 branches to a series of risk acknowledgement related processes beginning with an application information step 77. Step 77 begins the process of risk acknowledgement by accepting information about the application including such items as the owner of the application or information, the business operation, the control policy that is the subject of the risk acknowledgement and so forth. Once all the background information related to the application and the noncompliance is gathered, the process proceeds to a step 78 in which the application and aspect of the application related to the control policy is rated for sensitivity. A sensitivity rating can be obtained from an aggregation of several sensitivity rating assessments. For example, the user can rate the application, or aspect of the application related to the control policy as: highly sensitive, sensitive, internal public and not applicable.

After providing a sensitivity rating in step 78, the process proceeds to an impact rating in step 79. The impact rating relates to potential outcomes for various types of abrogations of the control policy. For example, possible impact ratings include, on a scale from high impact to low impact: catastrophic; severe; moderate; and low. Following the impact rating, the process continues to step 80, in which the user is asked to rate the occurrence probability of a risk related event impacting the application related to non-compliance with the associated control policy. Selections for probability can be, for example: high; medium; and low. Once the rating factors in steps 78, 79 and 80 are entered, the procedure continues with step 81.

In step 81, the user is asked to justify the reasons for risk acknowledgement and enter information that can be transferred to a risk management assessor for review. The process then continues to step 82 in which the user is asked to input information related to compensation and control procedures that can reduce the risk of non-compliance with the control policy. Again, this information is input in a format that can be transferred to a risk management assessor for review. The process then continues with step 83, in which the user is asked to input information related to implementation of a plan to bring the application into compliance with the particular control policy. As with steps 81 and 82, the user inputs information in a format that can be transferred to a risk management assessor for review.

Once a user enters all of the information related to risk acknowledgement in steps 77-83, the risk acknowledgement information is submitted for review and approval in step 84. While the risk acknowledgement information is pending approval in step 84, any user accessing the risk status is presented with a visual indicator of the risk acknowledgement status to indicate that approval is still pending, and the approval period has not yet expired.

While the risk acknowledgement information is pending approval, a risk management assessor can review the risk acknowledgement information in decision step 85 and decide whether to approve the risk acknowledgement. Decision step 85 also represents a default decision that occurs if the period during which approval is pending expires, indicating that no approval has been granted. Accordingly, decision step 85 branches to step 86 if approval has been granted, and branches to step 87 if approval is not granted for the risk acknowledgement information. In step 86, a warning indicator displayed to the user indicates approval of the risk acknowledgement information. A warning indication informs the user that the application is not in compliance with control policies, but that an approved risk acknowledgement response is in place. Step 87 also provides a visual indication to the user, in this case indicating that the application is not in compliance with one or more control policies, and no approved corrective action plan is in place. Accordingly, the indicator produced in step 87 is considered a critical indicator for the level of risk associated with non-compliance in the particular application. Once a risk acknowledgement response is in place, the user can renew the response if a time limit is set for compliance, for instance, and an assessor approves the risk acknowledgement renewal. In addition, once a risk acknowledgement is approved, a notification is sent to all other members assigned to roles associated with the particular application. Other notifications to the members having a role in the risk assessment process can include a thirty day warning prior to expiration of a risk acknowledgement approval period, and a warning that a corrective action plan is due to expire.

The processes shown and described in FIGS. 3 and 4 are related to each other in that FIG. 3 shows how compliance level indicators are determined, while FIG. 4 shows how risk acknowledgement indicators are produced. FIG. 4 is a more detailed description of the manner in which risk is assessed for a particular application, project, etc. related to risk acknowledgement. FIG. 3 integrates risk acknowledgement status in an overall indication of risk status for an application, project and so forth.

Referring now to FIG. 5, a chart for use with entering information related to risk acknowledgement is shown. The form in FIG. 5 is an electronic format form that can be filled out by a user online. The form, shown generally as a form 99, includes a section 90 identifying the type of risk acknowledgement information entered on the form. The type of risk acknowledgement information includes new, permanent, renewal and review information. A section 91 of form 99 provides information related to the application or information for which the risk assessment is conducted. These items of information include the information or application owner, the business operation, department names, applicable policy identifiers and so forth. Section 92 is provided for ranking sensitivity of the information or application. The sensitivity rankings in section 92 include highly sensitive, sensitive, internal, public and not applicable.

Section 93 permits the user to select an entry for potential impact of activities associated with non-compliance of the identified control policy. Potential impact entries selectable by the user include: catastrophic, severe, moderate and low. Section 94 allows the user to select a likely probability of occurrence for risk related events. For example, if an event occurred that the identified control policy is formulated to prevent, and this particular application is likely to incur the same type of risk events, the probability might be ranked high. Selections available for the user to rank the probability of occurrence are high, medium and low.

The remaining sections of form 99 are open entry style sections that allow the user to enter information that is generally applicable to risk acknowledge. For example, in section 95 the user is asked to input a statement describing the reasons for the risk acknowledgement. In section 96, the user can enter information describing controls and procedures that can compensate for non-compliance, or reduce the resulting risk from non-compliance. In section 97, the user is requested to discuss the background of the potential impact of non-compliance for the application or information. Section 98 allows the user to input a description of an implementation plan that is structured to achieve compliance with policy controls applicable to the information or application.

Referring now to FIG. 6, a sample chart available to a user for rating risk is shown. Chart 129 has a number of rows related to questions that can assist in rating the application or information for risk sensitivity. The chart, as with FIG. 5, is available online, so that the user can make entries in electronic format and transfer the document to a reviewer. The user fills in the chart by assigning severity ratings for risk categories identified as DISCLOSED, MODIFIED and REPUDIATED. The user assigns a severity rating to each column associated with each of the questions in these several rows. For example, in response to question 2, in the second row, the user may rate disclosure as severe, modification as moderate, and repudiation as catastrophic.

Once all the entries in the chart have been completed, the user can submit the form for use with the risk status process. For example, a highly sensitive application, as determined through chart 129, which is not in compliance with one or more control policies, is assigned a risk factor indication of critical. The critical risk factor indication may supersede the controls in place for risk acknowledgement, if the application is indicated as being extremely sensitive in several areas, for example.

Figure 7:
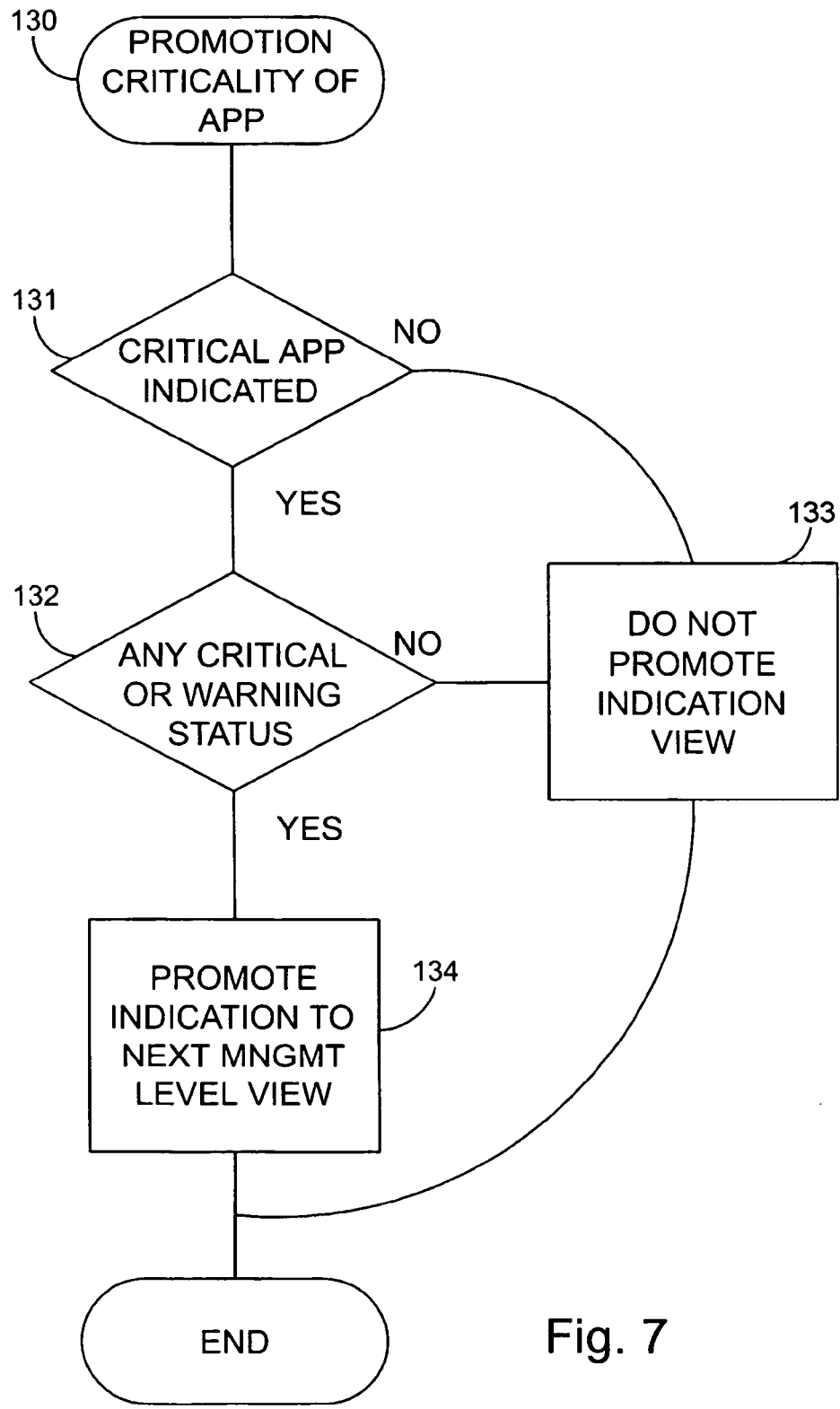
FIG. 7 is a flow diagram illustrating the process by which a non-compliant risk process is elevated to another level of management.

Referring now to FIG. 7, a flow diagram of promotion of a risk status through various managerial levels is shown. As discussed above, applications with sensitivity ratings that are very high have risk status indicators that are promoted to upper managerial levels for a manager risk status summaries. The process is identified in step 130, which continues with decision step 131. Decision step 131 makes the determination as to whether the application or information is critical to a particular project, business subdivision, or business operation, for example. If the application or information is not critical, decision step 131 branches to step 133, which prevents promotion of the risk status associated with the application to another managerial level. If the application is indicated as critical in decision step 131, a branch to decision step 132 is executed. Applications that are under development are not considered critical for this purpose, nor highly sensitive, and will not have their risk status promoted. Once an application is in actual production use, it will be susceptible to risk status promotion.

In decision step 132, a determination is made about whether the application has been rated highly sensitive in combination with non-compliance of one or more control policies. If a compliance status indicator shows critical, or indicates non-compliance, or if an application is rated as being sensitive and it has a risk status associated with it indicating a warning, then decision step 132 branches to promotion step 134. In step 134 the relevant risk statuses are promoted to the next managerial level. A manager of a business subdivision, for example, can view a risk status display composed of a compilation of risk statuses for various projects and applications associated with the business subdivision that is within his managerial purview. Accordingly, when a risk status is promoted to a managerial level, such as the level associated with a subdivision manager, step 134 serves to present appropriate statuses for the various projects and applications associated with the subdivision.

Referring now to FIG. 8, a high level display 159 shows a high level manager risk status view. In display 159, a senior business executive responsible for a major business operation can view the top level status of compliance and risk management for the business operation. In display 159, a number of selection elements 157 provide the business executive with options for reviewing risk and compliance for various levels of the business operation. Risk and compliance status elements for the top level of the business operation are shown in an indicator section 158. As illustrated in section 158, the business operations are shown as being in compliance with applicable policies, non-compliant, in progress, compliant with compensating controls in place, unassigned or not applicable. A warning indicator is shown under the heading "Managing Risk", for instance. This indicator shows that an instance of non-compliance exists at a lower level with a low sensitivity level, or an approved risk acknowledgement procedure is provided for a non-compliant feature. As discussed above, the business executive can select the warning indicator to be provided with a display expanding the compilation that has resulted in the warning indicator in section 158. Section 158 also shows YES/NO indicators for both "Corrective Action Plan" and "Risk Acknowledgement" headings. These indicators reflect the logic used to determine when an indicator to the left should be promoted.

Referring for a moment to FIG. 2A, the view shown in display 159 is equivalent to that available in status display 23. Accordingly, a senior business executive can access a top level status display once they have logged into home page 22, and are recognized as a senior business executive, responsible for this particular business operation.

Figure 9:
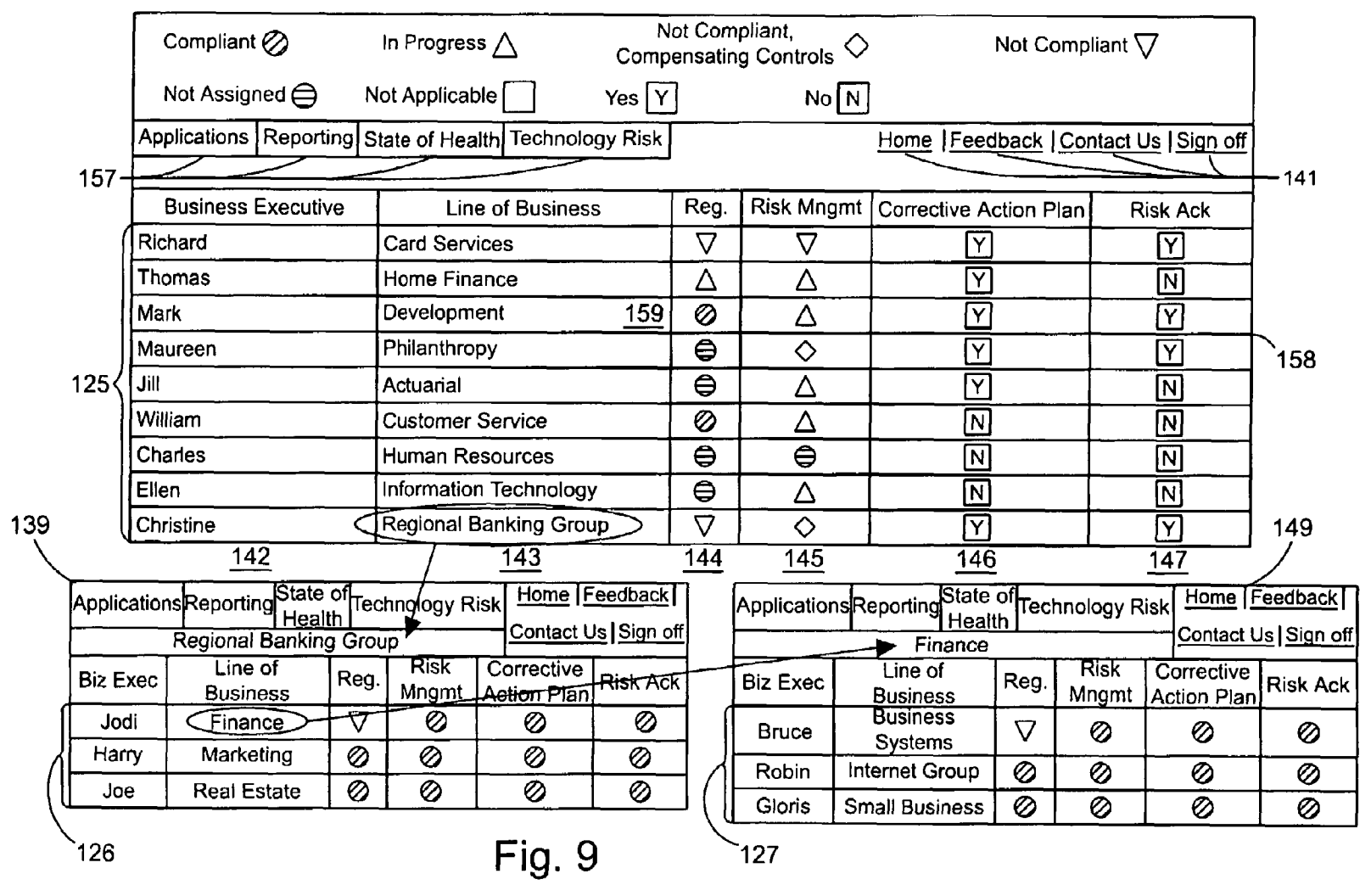

Referring now to FIG. 9, views of consolidated risk management displays are shown. The displays illustrate the linking facility between a business operation, a division and groups within a division hosing various applications. The displays, shown generally as displays 139, 149 and 159, provide a status view of control policy compliance related to various aspects of a business operation. Tabs 157 can be selected to display a technology risk management state of health, technology risk awareness reports or application information. Link selectors 141 provide the user with access to various portions of the general system such as a start screen (home), feedback, signout, and so forth. The status of compliance with regard to various subdivisions for a business operation is shown in chart 125. A column 142 of chart 125 displays managers related to a particular subdivision within the business operation. Column 143 describes the subdivision for which the managers listed in column 142 have responsibility. Column 144 displays indicators related to compliance with federal regulations. Round circles in column 144 indicate compliance (preferably colored green in practice), while down arrow indicators show non-compliance (preferably colored red in practice). Accordingly, the business subdivision labeled "Regional Banking Group" is indicated as being not in compliance with federal regulations.

Referring for a moment to FIG. 8, column 145 illustrates the status of compliance with regard to risk management. Warning symbols in column 145 (see FIG. 8) are shown as diamonds (preferably colored amber in practice). Accordingly, the first entry in column 145 is not in compliance, while the fourth and last entries indicate a warning for compliance. The third entry in column 144 shows an example of a business subdivision in compliance with regulatory requirements. Column 146 shows whether a corrective action plan is in place for each of the business subdivisions. The same indications of compliance, warning and non-compliance are used to provide indications for each of the entries in columns 144, 145. The entries in columns 146, 147 provide a YES/NO indication to mark the status of the business subdivisions with respect to corrective action plans and risk acknowledgement.

Column 147 shows the status of risk acknowledgement for the various business subdivisions. As illustrated in chart 125, the first two entries of column 147 indicate yes and no, respectively, for risk acknowledgement. The first entry is paired with an indication of non-compliance in columns 144, 145, meaning that a lower level business operation lacks compliance and does not have a satisfactory corrective action plan or risk acknowledgement. The second entry in columns 146, 147 is paired with an indication of in progress, meaning that a lower level business operation has a non-compliant application, but has compensating corrective action in place, even though the risk acknowledgement is negative.

Referring again to FIG. 9, the various displays 139, 149 and 159 are available to the business managers indicated in column 142, and the various lower level managers responsible for subdivisions, projects or applications can only view display 139 or 149, appropriate to their permission level. For example, if the business manager indicated in the last entry in column 142 wishes to see the underlying statuses for the federal compliance indicator in the first row of column 144, she can select the lower level link, indicated as an underline in the title of the corresponding entry in column 143. The business operation manager can thus view the status of risk with regard to the various subdivisions, as indicated in chart 126 of display 139. For example, if the manager selects the first entry in column 143 of chart 126, a view such as that shown in display 149 is provided. In chart 127 of display 149, the status of various subdivisions for the selected business operation is provided. As can be seen in chart 127, only one entry indicates a status of non-compliance. Upon promotion of these statuses to the next higher managerial level, such as that shown in the first row in display 139 of FIG. 9, the status indicators appear as being non-compliant. If the indicators in chart 127 showed non-compliance, or showed a warning status because of a high sensitivity rating, they would be promoted to the next higher managerial level and be displayed as warning or non-compliant indicators, depending on their sensitivity, in chart 126.

Tabs 157 permit the user to select an application for update or review of the risk status. A user can request to add, modify or delete an application, and accordingly change the associated risk status. Selection of a particular application for review allows the user to see all the applicable policies for that application, and the status indicators regarding the policy compliance. For example, each policy associated with an application is listed, and each entry in the list has an indicator that provides an assessment status at a glance, such as compliant, non-compliant, pending, not applicable, and so forth. The listed policies can be selected to review responses to policy questions and ratings for application sensitivity and criticality. If a policy is added, changed or deleted, the affected user or person assigned a risk related role with respect to the application receives a notification. The user can then access the policy directly to review the changes and respond to new risk rating criteria.

If an application has an outside vendor related component, for example if a third party furnishes a portion of the application functionality, any risks related to the outside vendor can be incorporated into the system. For example, if the vendor breaches a contract term, discloses confidential material, or provides inadequate support for the supplied components, these factors can be incorporated into an application risk assessment and rated according to severity. In addition, if an outside vendor wishes to take part in the risk assessment, they can receive feedback on the effectiveness of a corrective action plan, or receive specifications for achieving policy compliance, for example. It should be apparent that many other types of vendor interaction are contemplated by the present invention, with the main focus being coordination of risk assessment and corrective action plans.

Referring to FIG. 2A, reports 21 are also available for providing aggregated information based on several criteria. For example, a report can be generated to summarize risk statuses by each policy in a business operation. Alternately, reports can summarize risk related to corrective action plans or risk acknowledgement. These reports can be very useful to upper levels of management in a hierarchically organized enterprise, since policies can be evaluated easily for compliance, and informed decisions on funding initiatives can be made at the highest levels. The report information is also exportable in a number of formats for simple cross platform transfer and use.

Referring now to FIG. 10, a display of policies is provided with compliance indicators. Each policy is in the form of a hyperlink that the user can select to immediately jump to a status of their responsibility for that policy. For example, a project manager can select the "Network Security" policy that has a warning indicator, and review the portions of the policy that represent risks related to implementation of the project she manages. The manager can review the procedures in place directly from the policy link screen, and input procedures or responses to overcome the risk. FIG. 10 thus illustrates an abstract path for policy compliance for any level manager, whether at an operation, division, project or application level. The display shown in FIG. 10 also provides an indication of the compliance status for all policies related to the manager's responsibility level. The manager can thus determine at a glance which aspects of their risk status is in compliance, and which may need further responses.

Figure 11:
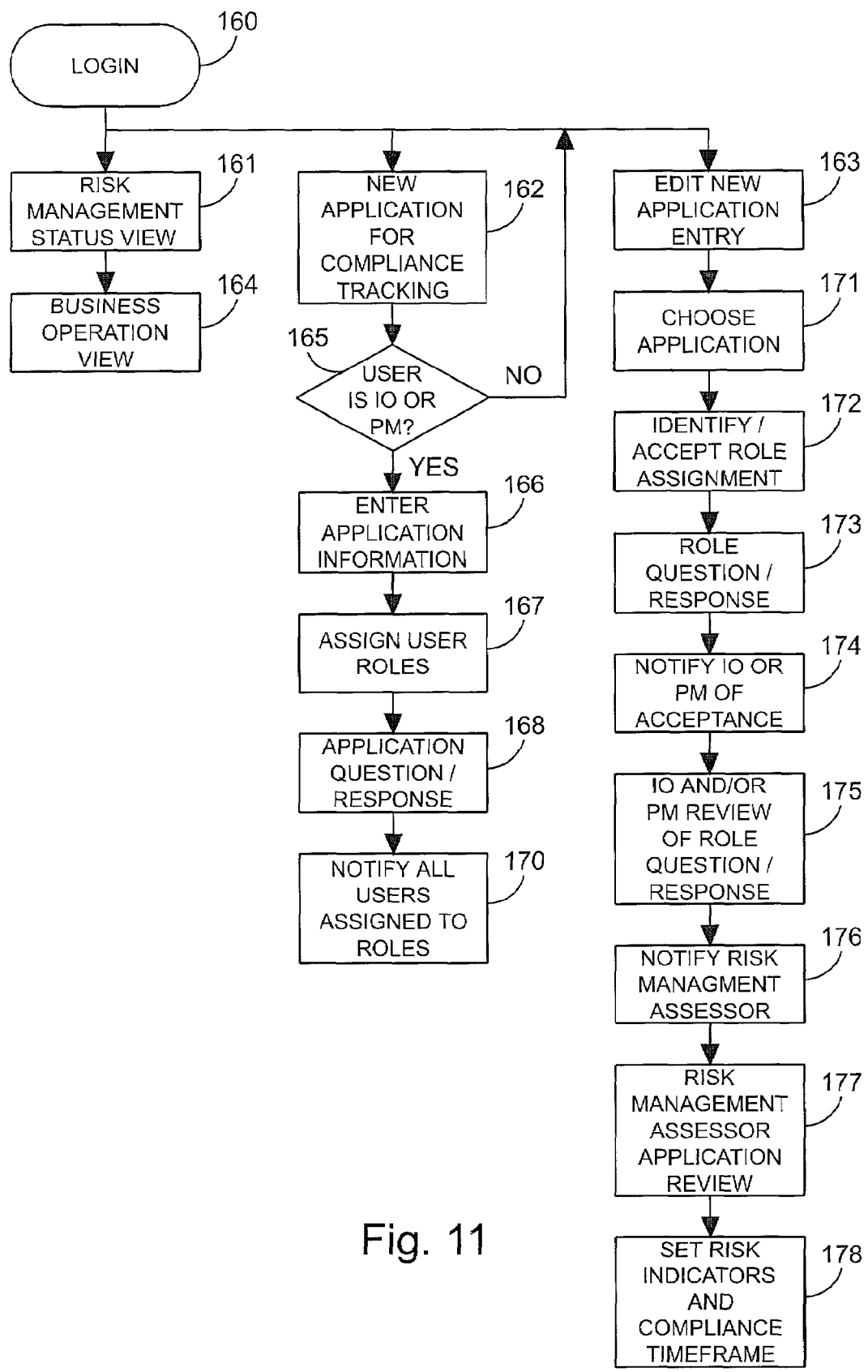
FIG. 11 is a flow diagram describing a process for adding a new application to the risk management system according to the present invention.

Referring now to FIG. 11, a flow diagram of a process for establishing new entries in the risk management system according to the present invention is shown. The process begins with the user accessing the system through a login 160. From login 160, the user is able to select from three choices: a risk management status 161; a new application entry 162; and an application parameter editing 163. Selection of risk management status 161 provides the user with various displays already illustrated, such as business operation compliant status 164, which is equivalent to display 159 shown in FIG. 8. If the user selects new application entry 162, the process proceeds to decision step 165 in which a determination is made as to whether the user is an information owner or a project manager. If the user is neither an information owner nor a project manager, decision step 165 branches back to the login screen state provided through login 160. If the user is determined to be an information owner or a project manager, decision step 165 branches to information entry step 166.

In information entry step 166, the user enters details about the new application, such as the application name, the project manager, the information owner and so forth. The process then proceeds to assignment step 167, in which roles for the application are assigned to various individuals. The assignment of a role within the scope of the new application provides the assignee with certain responsibilities related to tracking and managing risk criteria. Once the appropriate roles are assigned, the process proceeds to application questionnaire step 168. In step 168, the information owner or project manager answers a series of questions related to the application. The information owner or project manager then submits the completed questionnaire in electronic format, and the process continues to notification step 170.

Notification step 170 provides notification to all individuals assigned to roles for responsibilities in the new application. The persons that are notified in notification step 170 are automatically provided authorized access to the risk management system associated with the new application. The notification received in notification step 170 instructs the individuals on how to login through login step 160 and select application editing step 163. Once the individuals with roles and responsibilities related to the application enter editing step 163, they are prompted to choose the application for which they have been assigned responsibility or a role in step 171. Once the users selects the application for which they have a role or a responsibility, the process continues with step 172, in which the user identifies themselves according to their role with respect to the chosen application. For example, the user may select one or more roles to which they have been assigned for responsibility during the creation of the application in the risk management system. The user may have more than one role, such as, for example, security administrator and project manager.

Once the user selects the role with which they have been identified for the application, the process continues with step 173 in which the user is presented with questionnaires related to their respective roles. The questionnaires provided in step 173 are preferably partially completed with existing information available for the application. The user need only complete questionnaire sections that are still blank or that require further response. With the completion of the questionnaire, the user submits the responses and the process continues with step 174. In step 174, the project manager and/or information owner is notified that the questionnaire for a particular role has been completed. Upon notification, the process moves to step 175, in which the project manager or information owner can review the responses submitted in the role questionnaires. Once the questionnaires are reviewed, the process continues with step 176, in which the collected and reviewed questionnaires are submitted to the risk management system for review and approval. In step 177, a risk management assessor reviews the complete application, including the information provided by the information owner/project manager and the responses provided by the individuals assigned to the various roles.

Once the risk management assessor has reviewed all the aspects of the application, they can take appropriate action that results in the setting of indicator statuses denoting compliance with control policies and risk acknowledgement in step 178. At this point, the application has been entered into the risk management system, and individuals responsible for various aspects of maintaining compliance with control policies can access and update the system, as described above.

Among the information entered in step 168, for example, are hardware requirements, hardware locations and vendors, associated applications, software licenses, software vendors and so forth. The initiator of the new application also responds to questions such as whether the application will run on a mainframe, mini-computer or local network, whether the information related to the application will be stored on a LAN, if disaster recovery is needed, and whether any business plans should be updated.

When the entire process for the new application has been completed, such as in step 177, time frames for compliance are set so that the compliance status indicators that are shown as pending will, after the compliance time frames, be set to appropriate indications of status, in step 178. For example, if the initial application is not in compliance with one or more control policies, the status indicators related to compliance with the particular control policies will show that a compliance status is pending. After the time frame for response expires, if no action has been taken with regard to obtaining compliance for the non-compliant aspects of the application, the related status indicators will show a critical indication that will be promoted to the next managerial level, as discussed above.

Figure 12:
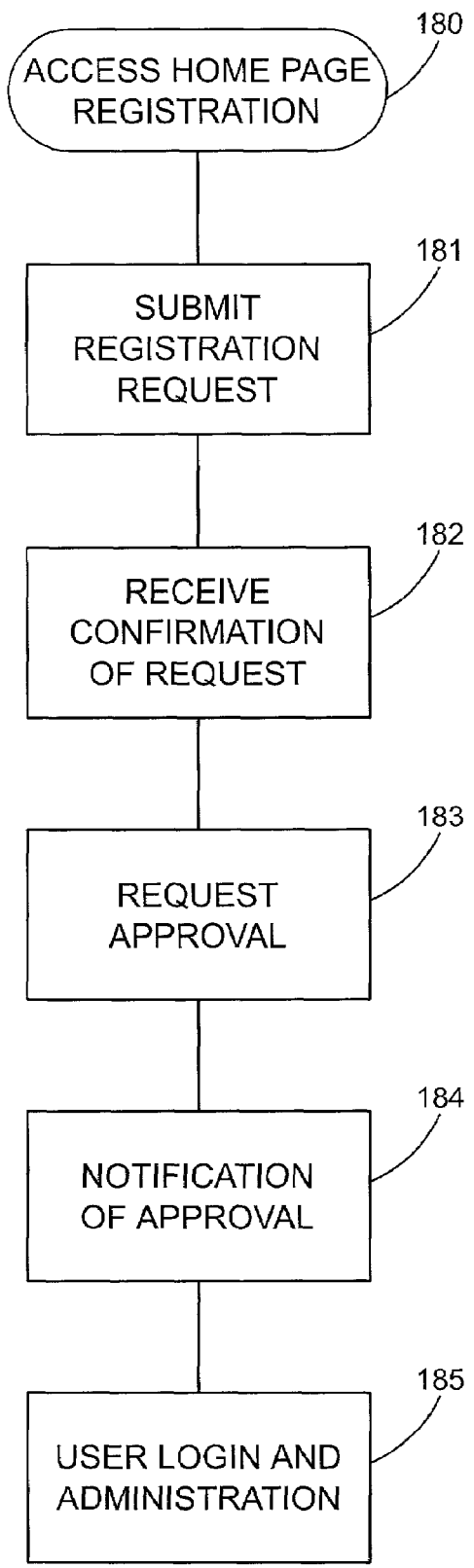
FIG. 12 is a flow diagram showing a process for obtaining access to the system according to the present invention.

Referring now to FIG. 12, a flow diagram for a process of receiving authorization for access to the risk management system is shown. The process begins in step 180 with the user accessing a registration request form from the risk management system introductory display. The user is prompted to fill out a request form, and submits the registration request in step 181. Once the request for registration is submitted, the user receives notification confirming receipt of the request in step 182. The acknowledgement of the receipt of the registration request serves as a check on access to the system to provide a security feature for the system.

System administrators and risk management administrators review the request for access to the system in step 183 to provide a multi-level approval structure. Administrators can search for a user profile and create, modify or delete user profiles in the system. User profiles may contain a number of pieces of information related to access of the system, such as a business ID, an accounting center, e-mail addresses, title and job grade, and so forth. Once the appropriate approvals have been granted, the user is notified in step 184. The user is provided with a logon ID, and an initial password. Once notified, the user can login as shown in step 185, using the login ID provided and the initial password. Once the user gains access to the system using the logon ID and password provided, the system prompts the user to provide a new password of the user's choosing. According to various security protocols, the user is preferably informed of password conventions such as, for example, use of a mix of alphanumeric characters and non obvious combinations, such as passwords resembling logon IDs. Once the user is admitted to the system in step 185, the user is provided with a number of administrative tracking features, such as connection time, logon time outs, periods of inactivity and so forth.

Changes to the user account can be made through the same process shown in FIG. 12, by submitting a request for approval through the relevant administrators. The user can also request such typical administrative activities as password resetting, lockouts, releases and so forth.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A compliance tracking system, comprising:
a first storage device containing a first dataset of data related to regulatory and enterprise procedural policy information;
a second dataset storage device containing a second dataset of data related to a state of an operation activity;
a processor coupled to said first and second datasets, and operable to access and manipulate data in said first and second datasets;
a user interface device coupled to said processor and operable to receive user input and provide instructions to said processor for accessing and manipulating said first and second datasets, wherein said user input is based on a compliance response structure comprising a set of role definitions including a plurality of respective responsibilities, wherein said responsibilities being related to respective portions of said state of said operation activity, and wherein said instructions being related to said responsibilities whereby a level of compliance is modified based upon a combination of said responsibilities and respective portions of said state of operation activity;
said processor being further operable to compare data contained in said first and second datasets and provide processor-generated indicia of compliance to said user interface device based on a result of said comparison;
first determination means for determining whether an operation activity is in compliance or non-compliance based on a comparison of the data contained in the first and second datasets;
second determination means for determining whether non-compliance is the result of a new policy or regulation or amendment to a policy or regulation;
risk assessment means for assessing risk and identifying risk factors associated with the state of the operation activity and the new policy or regulation or amendment to a policy or regulation;
third determination means for determining whether a risk acknowledgement has been approved, wherein risk acknowledgement approval comprises accepting the risk or developing or implementing a plan to achieve compliance; and
plan selection means for developing or implementing a plan to achieve compliance, wherein the plan is based on a sensitivity rating, an impact rating, a probability rating, and compensation and control procedures.

2. A compliance tracking system according to claim 1 wherein said processor further comprises a reporting engine processing device; and
said reporting engine processing device can operate on said indicia of compliance to produce a compilation of compliance indicia in a summary format.

3. A compliance tracking system according to claim 1, wherein said indicia of compliance pertains to a plurality of portions of said operation activity.

4. A compliance tracking system according to claim 1, wherein said processor further comprises a registration engine processing device; and
said registration engine processing device being operable to accept requests for registration from said user interface device, provide a notification to at least another user interface device for approval of said registration request, and provide a notification to said user interface device indicative of approval or refusal of registration.

5. A compliance tracking system according to claim 1, wherein said instructions include answers to a questionnaire related to assessing a level of compliance.

6. A compliance tracking system according to claim 1, wherein said instructions include information related to at least one of a sensitivity and a criticality of said operation activity with respect to a level of compliance.

7. A compliance tracking system according to claim 2, further comprising:
a management structure having a plurality of management levels; and
said compilation of compliance indicia is accessible to a management level above at least another management level.

8. A compliance tracking system according to claim 7, wherein said instructions include information related to at least one of a sensitivity and a criticality of said operation activity with respect to a level of compliance.

9. A compliance tracking system according to claim 8, wherein said compilation of compliance indicia is accessible to said management level based on said information related to said at least one of a sensitivity and a criticality.

10. A compliance tracking system according to claim 1, wherein said processor further comprises an administration engine processing device;
said administration engine processing device is operable to at least one of input data received from said user interface device into said second dataset and provide authorized access to said processor through said user interface device.

11. A method for tracking status and providing status feedback using a computer, comprising:
accessing a set of rules in a database, the rules being related to an enterprise operation wherein said rules provide conformance standards for regulatory or enterprise procedural policies;
accessing a set of data related to compliance with said set of rules;
comparing, by a processing engine, said set of data against said set of rules to produce a compliance status;
providing a computer-generated indication of said compliance status to a user interface; and
accepting user input comprising instructions through said user interface whereby a condition of said set of data is modified, thereby improving said compliance status, wherein said user input is based on a compliance response structure comprising a set of role definitions including a plurality of respective responsibilities, wherein said responsibilities being related to respective portions of said state of said operation activity, and wherein said instructions being related to said responsibilities whereby a level of compliance is modified based upon a combination of said responsibilities and respective portions of said state of operation activity;

determining, by a processor engine, whether an enterprise operation is in compliance or non-compliance based on a comparison of the data contained in the first and second datasets;

determining, by a processor engine, whether non-compliance is the result of a new policy or regulation or amendment to a policy or regulation;

receiving at least one survey generating, deleting, modifying or revising data related to the enterprise operation; and determining, by a processor engine, if a risk acknowledgement associated with the enterprise operation has been approved, wherein risk acknowledgement approval comprises accepting the risk or developing or implementing a plan to achieve compliance; and developing or implementing, by a processor engine, a plan to achieve compliance, wherein the plan is based on a sensitivity rating, an impact rating, a probability rating, and compensation and control procedures.

12. A compliance tracking system, comprising:

a first storage device containing a first dataset of data related to regulatory and enterprise procedural policy information;

a second storage device containing a second dataset of data related to a state of an operation activity;

a processor coupled to said first and second datasets, and operable to access and manipulate data in said first and second datasets;

a user interface device coupled to said processor and operable to receive user input and provide instructions to said processing engine processor for accessing and manipulating said first and second datasets, wherein said instructions include answers to a questionnaire related to assessing a level of compliance and information related to at least one of a sensitivity and a criticality of said operation activity with respect to a level of compliance, wherein said user input is based on a compliance response structure comprising a set of role definitions including a plurality of respective responsibilities, wherein said responsibilities being related to respective portions of said state of said operation activity, and wherein said instructions being related to said responsibilities whereby a level of compliance is modified based upon a combination of said responsibilities and respective portions of said state of operation activity;

said processor being further operable to compare data contained in said first and second datasets and provide processor-generated indicia of compliance to said user interface device based on a result of said comparison, wherein said indicia of compliance pertains to a plurality of portions of said operation activity, and wherein said device further comprises a reporting engine processing device, and wherein said reporting engine processing device can operate on said indicia of compliance to produce a compilation of compliance indicia in a summary format;

a first determination processor or interface device for determining whether an operation activity is in compliance or non-compliance based on a comparison of the data contained in the first and second datasets;

a second determination processor or interface device for determining whether non-compliance is the result of a new policy or regulation or amendment to a policy or regulation;

a risk assessment processor or interface device for assessing risk and identifying risk factors associated with the state of the operation activity and the new policy or regulation or amendment to a policy or regulation;

a third determination processor or interface device for determining whether a risk acknowledgement has been approved, wherein risk acknowledgement approval comprises accepting the risk or developing or implementing a plan to achieve compliance; and a plan selection processor or interface device for developing or implementing a plan to achieve compliance, wherein the plan is based on a sensitivity rating, an impact rating, a probability rating, and compensation and control procedures.

13. A compliance tracking system according to claim 12, further comprising:

a management structure having a plurality of management levels; and said compilation of compliance indicia is accessible to a management level above at least another management level.

14. A compliance tracking system according to claim 12, wherein said compilation of compliance indicia is accessible to said management level based on said information related to said at least one of a sensitivity and a criticality.

15. A compliance tracking system according to claim 12, wherein said processor further comprises an administration engine processing device;

said administration engine processing device is operable to at least one of input data received from said user interface device into said second dataset and provide authorized access to said processor through said user interface device.

* * * * *